United States Patent
Helter et al.

(10) Patent No.: US 9,686,323 B1
(45) Date of Patent: Jun. 20, 2017

(54) METHOD AND APPARATUS FOR SEQUENCING REMOTE DESKTOP CONNECTIONS

(71) Applicant: Teradici Corporation, Burnaby (CA)

(72) Inventors: Paul Andrew Helter, Coquitlam (CA); Nou Dadoun, North Vancouver (CA)

(73) Assignee: Teradici Corporation, Burnaby, British Columbia (CA)

(*) Notice: Subject to any disclaimer, the term of this patent is extended or adjusted under 35 U.S.C. 154(b) by 343 days.

(21) Appl. No.: 13/942,170

(22) Filed: Jul. 15, 2013

Related U.S. Application Data

(60) Provisional application No. 61/785,340, filed on Mar. 14, 2013.

(51) Int. Cl.
*G06F 15/16* (2006.01)
*H04L 29/06* (2006.01)

(52) U.S. Cl.
CPC ................. *H04L 65/1066* (2013.01)

(58) Field of Classification Search
CPC ..................................... H04L 65/1066
See application file for complete search history.

(56) References Cited

U.S. PATENT DOCUMENTS

| | | | |
|---|---|---|---|
| 8,098,805 B2 | 1/2012 | Van Wyk et al. | |
| 8,107,461 B2 | 1/2012 | Sasaki et al. | |
| 8,185,550 B1* | 5/2012 | Eichler et al. | 707/783 |
| 9,075,496 B1* | 7/2015 | Gailey, Jr. | G06F 11/366 |
| 2002/0062347 A1* | 5/2002 | Low | G06Q 30/06 709/204 |
| 2002/0116489 A1* | 8/2002 | Davis | G06F 17/30873 709/224 |
| 2004/0203664 A1* | 10/2004 | Lei | H04M 3/53 455/414.1 |
| 2005/0080915 A1* | 4/2005 | Shoemaker | H04L 29/06027 709/231 |
| 2005/0091302 A1* | 4/2005 | Soin | H04W 4/20 709/200 |
| 2005/0091359 A1* | 4/2005 | Soin | G09G 5/006 709/223 |
| 2006/0070077 A1* | 3/2006 | Erlandson | G06F 11/0748 718/104 |
| 2006/0074618 A1* | 4/2006 | Miller | G06F 9/45504 703/13 |

(Continued)

OTHER PUBLICATIONS

Karim Chine, "Scientific Computing Environments in the age of virtualization, toward a universal platform for the Cloud", pp. 44-48, 2009 IEEE International Workshop on Open Source Software for Scientific Computation (OSSC), Jul. 5, 2009, Tunisia.

(Continued)

*Primary Examiner* — Blake Rubin
(74) *Attorney, Agent, or Firm* — Moser Taboada

(57) ABSTRACT

A method and apparatus for sequencing remote desktop connections. In one embodiment, the method comprises receiving, at a processor, a session exchange request from a first client in a first connection to a remote desktop; selecting, by the processor, a second client for connection to the remote desktop based on the session exchange request; configuring, by the processor, the second client; and orchestrating, by the processor, a second connection between the second client and the remote desktop.

19 Claims, 11 Drawing Sheets

(56) References Cited

U.S. PATENT DOCUMENTS

| | | | |
|---|---|---|---|
| 2007/0058637 A1* | 3/2007 | Lo | H04L 29/06027 370/395.2 |
| 2007/0168457 A1* | 7/2007 | Huerta | G06Q 30/02 709/217 |
| 2007/0168537 A1* | 7/2007 | Misra | H04L 65/1069 709/230 |
| 2007/0294626 A1* | 12/2007 | Fletcher et al. | 715/751 |
| 2008/0043091 A1* | 2/2008 | Lia et al. | 348/14.09 |
| 2008/0222249 A1* | 9/2008 | Tanaka | H04L 65/1066 709/204 |
| 2008/0270612 A1* | 10/2008 | Malakapalli et al. | 709/227 |
| 2009/0112996 A1* | 4/2009 | Baker, III | H04L 67/148 709/206 |
| 2009/0307600 A1* | 12/2009 | Arthur et al. | 715/740 |
| 2010/0131669 A1* | 5/2010 | Srinivas | G06F 9/5044 709/233 |
| 2010/0313199 A1* | 12/2010 | Chen | G06F 9/5055 717/177 |
| 2010/0325216 A1* | 12/2010 | Singh et al. | 709/206 |
| 2011/0053583 A1* | 3/2011 | Parmar | H04M 3/523 455/419 |
| 2011/0107331 A1* | 5/2011 | Evans et al. | 718/1 |
| 2011/0154222 A1* | 6/2011 | Srinivasan | H04L 65/403 715/753 |
| 2011/0158222 A1* | 6/2011 | Kerr | H04M 3/4938 370/352 |
| 2011/0225512 A1 | 9/2011 | Lauwers et al. | |
| 2011/0235520 A1* | 9/2011 | Maciej | H04M 3/42221 370/241 |
| 2011/0276661 A1* | 11/2011 | Gujarathi et al. | 709/219 |
| 2012/0077468 A1* | 3/2012 | Fan | G07C 9/00309 455/414.1 |
| 2012/0084369 A1* | 4/2012 | Henriquez et al. | 709/206 |
| 2012/0226742 A1* | 9/2012 | Momchilov | G06F 3/0481 709/203 |
| 2012/0226998 A1* | 9/2012 | Friedl | G06F 9/4445 715/760 |
| 2012/0281057 A1* | 11/2012 | Couse | H04N 7/147 348/14.03 |
| 2012/0311564 A1* | 12/2012 | Khalid | G06F 8/61 718/1 |
| 2013/0018803 A1* | 1/2013 | Challu | G06Q 10/06 705/304 |
| 2013/0212161 A1* | 8/2013 | Ben-Shaul et al. | 709/203 |
| 2013/0262581 A1* | 10/2013 | Charles | H04L 65/1066 709/204 |
| 2014/0032810 A1* | 1/2014 | Kanigicherla | G06F 9/4843 710/314 |
| 2014/0310414 A1* | 10/2014 | Reeves et al. | 709/225 |
| 2015/0149412 A1* | 5/2015 | Kobres | G06F 9/4416 707/640 |
| 2016/0255667 A1* | 9/2016 | Schwartz | H04W 76/022 |

OTHER PUBLICATIONS

Kaiser, J. "Step-by-step Guide to Remote Assistance", 10 pp., Jul. 1, 2001, USA.

Richardson, T.; Bennett, F.; Mapp, G.; Hopper, A., "A ubiquitous, personalized computing environment for all: Teleporting in an X Window System Environment", Personal Communications, IEEE, vol. 1, No. 3, pp. 6-12, 3rd Qtr, 1994, USA.

* cited by examiner

US 9,686,323 B1

METHOD AND APPARATUS FOR SEQUENCING REMOTE DESKTOP CONNECTIONS

CROSS-REFERENCE TO RELATED APPLICATIONS

This application claims benefit of U.S. Provisional Patent Application 61/785,340 entitled "Method for Sequencing Remote Desktop Connections", filed Mar. 14, 2013, herein incorporated in its entirety by reference.

BACKGROUND OF THE INVENTION

Field of the Invention

Embodiments of the present invention relate generally to a method and apparatus for enabling desktop resource sequencing operations to be applied to remote computing sessions.

Description of the Related Art

Protocols for supporting remote desktop assistance such as Microsoft Remote Desktop Protocol (RDP) or Windows Remote Assistance enable a user to share a desktop or allow an authorized administrator to pre-empt termination of a remote computing session in order to commandeer the user's desktop. These peer-centric management tools are generally suited to providing remote computer management functions such as helpdesk support. To better address business-oriented communications requirements, various products such as WebEx, NetMeeting or GoToMeeting provide features such as desktop sharing, white-boarding, telephony and video conferencing services. Such products generally require each desktop in the collaboration scheme to maintain specialized collaboration software. To address the requirements of modern point-to-point voice or video communications using internet telephony, standardized protocols such as Session Initialization Protocol (SIP) aided by centralized functions, such as proxy, registration and location services, enable various central exchange offerings expected from legacy Private Branch Exchange (PBX) platforms including call forward, call hold and conferencing for stand-alone or software-based phone endpoints.

While the recent rapid emergence of virtualized computing infrastructure had resulted in innovative machine creation and static provisioning services, methods for assigning desktop resources to facilitate business processes remain severely limited.

SUMMARY OF THE INVENTION

Embodiments of the present invention generally relate to a method and apparatus for sequencing remote desktop connections substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to transferring virtualized desktops between clients under management of a session exchange. The transfer can be initiated via a variety of transfer devices including the client as well as phones, remote desktops, smartphones, and the like.

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The invention encompasses all possible modifications and variations within the scope of the issued claims.

The term 'desktop resource' as used herein generally refers to a computer enabled for remote access by a client device. The computer provides a 'remote desktop' (alternatively termed a 'hosted desktop' in some embodiments) such as a MICROSOFT WINDOWS desktop or 'remote applications' (alternatively termed 'hosted applications' or 'published applications' in some embodiments). A remote desktop may be virtualized using Virtualized Desktop Infrastructure (VDI) technology, a shared desktop provided by a Remote Desktop Shared Host (RDSH) terminal server or a personal computer (PC) such as a workstation or blade PC enabled for remote access.

The term 'session' as used herein generally refers to a 1:1 computing connection between a client device such as a computer, thin client or a zero client and a desktop resource. In some Unified Communications (UC) embodiments, a session further comprises voice or video communications between the client and a voice or video client elsewhere on the network in concurrence with a remote computing connection between the client and the desktop resource.

The term 'client' as used herein generally refers to a computing platform which is directly utilized by a user to participate in remote access sessions with desktops and/or application servers. The client may include voice or video telephony capabilities such as a SIP client, webcam and so on. 'Client systems' are those clients comprising separate processing, display and user interface devices, typically connected via wired and/or wireless means while 'client devices' generally refer to integrated clients such as laptops, tablets or smartphones.

The term 'workflow' as used herein generally refers to a sequence of remote access connections among a set of desktop resources and clients to accomplish a work scenario.

Figure 1:
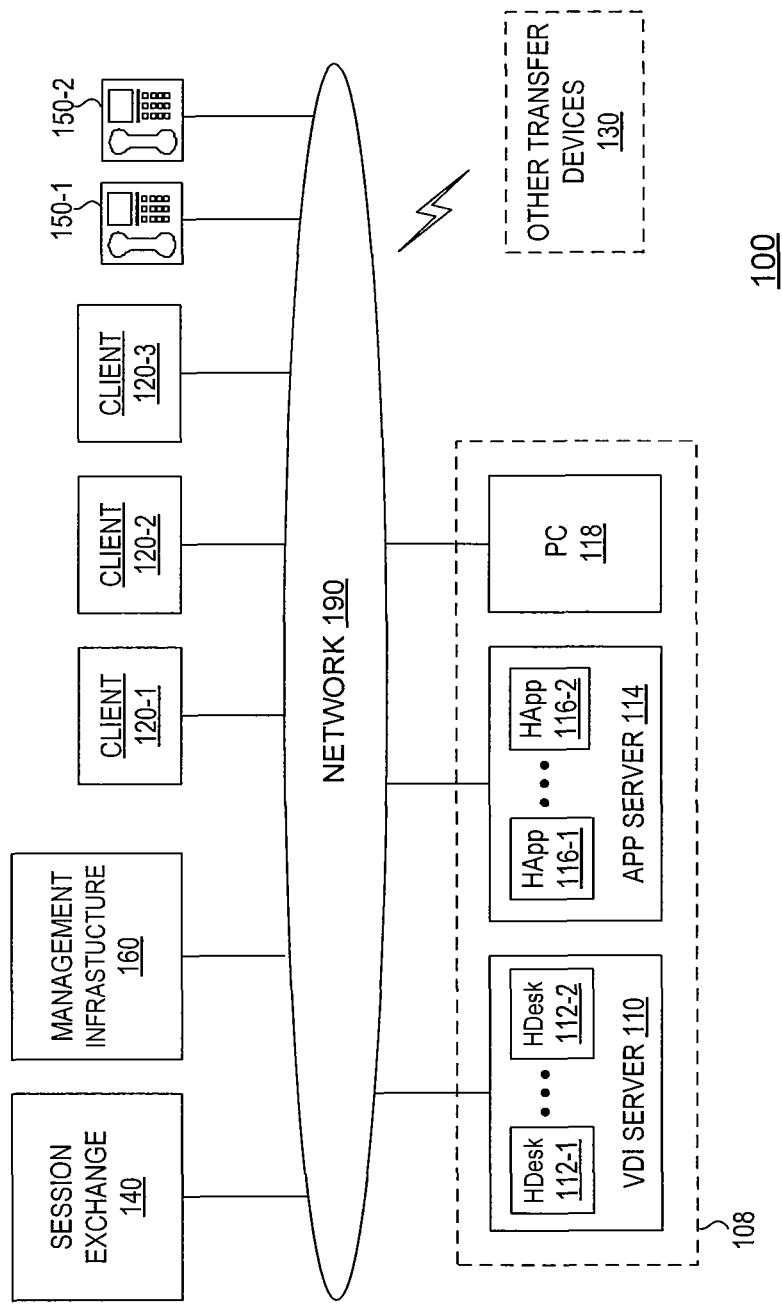
FIG. 1 illustrates selected details of an embodiment of a system comprising a session exchange incorporating a connection sequencer for coupling desktop resources to clients.

In one or more embodiments of the present invention, a computing system, such as system 100 in FIG. 1, comprises a session exchange 140 coupled to a network 190 and configured to facilitate the establishment and sequencing of remote computing sessions between clients and desktop resources. In effect, the session exchange 140 provides sequencing services for desktop resources (such as physical desktops, hosted desktops, or hosted applications) in addition to complex workflow management pertinent to a variety of industries.

FIG. 1 illustrates selected details of an embodiment of a computing system 100 ("system 100") comprising various desktop resources 108 coupled to the network 190 and enabled for connections to various clients under orchestration of a session exchange 140. In an embodiment, system 100 is a corporate enterprise network comprising desktop resources such as hosted desktops (shown as an HDesk 112-1 and an HDesk 112-2 and collectively referred to as "HDesk 112") on a VDI server 110, hosted applications (shown as HApp 116-1 and an HApp 116-2 and collectively referred to as "HApp 116") on an application server 114, and a Personal Computer (PC) 118 configured with a suitable remote computing protocol. However, only one desktop resource is generally required and variations of system 100 may comprise any number of desktop resources, any combination of VDI servers, application servers and PC's, including variations without VDI resources, other variations without application servers and others without PCs. The VDI server 110 and application server 114 comprise server hardware generally configured with virtualization software or cloud-compatible platform software such as OPEN-STACK. The application server 114 may provide shared desktop software services and/or hosted applications published with the aid of services such as MICROSOFT App-V or VMWARE Thin-App.

A user of system 100 may access an HDesk 112, an HApp 116 or PC 118 from various clients configured with a client agent, including client 120-1, client 120-2, and a client 120-3 (collectively referred to as client 120) or other transfer device 130 such as a laptop, a smartphone, a tablet PC, or the like, when the clients 120 and other transfer device 130 are coupled to the network 190. In some embodiments such as a corporate cubicle environment, client systems are deployed in conjunction with other logically paired (and typically local) network devices such as stand-alone IP phones 150 coupled to network 190 (shown as a phone 150-1 and a phone 150-2) and a user of client 120-1 is assigned phone 150-1 and so on.

In some embodiments, a user may access the HDesk 112-1 from client 120-1 and, at some point in time, it is determined that an HDesk 112-1 must be transitioned to a second user at a second client such as a second user at client 120-2. Such a determination may be made in a number of ways, such as at the desire of the first user to forward the first session to the second user or under control of the session exchange 140, or in response to a particular software state associated with the HDesk 112-1, or under instruction from an administrator or another computer with appropriate authorization. In such a session transfer embodiment, the session exchange 140 orchestrates an apparent session transfer by initiating a tear-down of the first session and initiating the setup of a second session between the HDesk 112-1 and the second client 120-2. Such an orchestration may further comprise provisioning of various support services such as user notification (e.g., prompt the second user of a pending session), provisioning of session pools or session queuing services that provide the second user flexibility in accepting requested sessions, for example by delaying acceptance or selecting the second session from a list of pending sessions. In other embodiments, the session exchange provides rule-based connection sequencing to automate setup and tear-down of connections between specified clients and desktop resources. In some such embodiments, rule-based connection sequencing is performed in conjunction with automated desktop resource management in order for desktop resources to be instantiated, utilized, analyzed or destroyed to meet production demands.

The management infrastructure 160 is coupled to network 190 and comprises resource management, signaling and directory functions, an embodiment of which is described below in association with FIG. 2. The network 190 comprises a communication system (e.g., the Internet, local area network (LAN), wireless LAN, wide area network (WAN), and the like).

Figure 2:
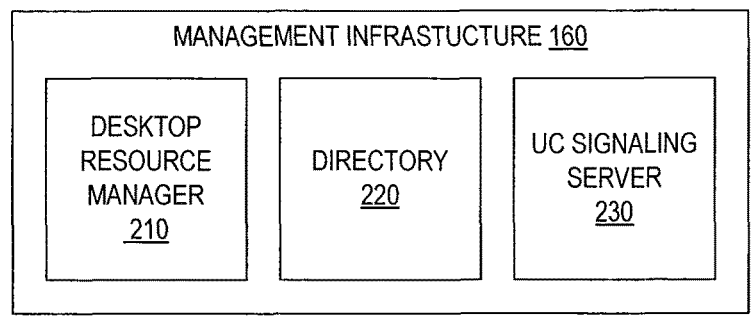
FIG. 2 illustrates selected details of an embodiment of management infrastructure.

FIG. 2 illustrates an embodiment of management infrastructure 160 comprising a desktop resource manager 210, directory 220 and Unified Communications (UC) Signaling server 230. The desktop resource manager (DRM) 210 comprises software enabled to provision and maintain virtualized desktops and applications, for example by providing machine creation or desktop composition services, virtual machine (VM) cloning or replication services, also mapping virtual machines and applications to specific hardware platforms 110 or 114 and providing capabilities such as load balancing, migration, failover, and the like. In a typical embodiment, desktop resource manager 210 comprises machine-readable instructions and data stored in memory of a server. In some embodiments, desktop resource manager 210 comprises administration services used for direct administering components of system 100. For example, an administration terminal may be used to directly take over control of (or "grab") a HDesk 112 with or without involving negotiations with a connection sequencer 470 described below with respect to FIG. 4. In some embodiments, administration services and desktop resource management services are provided by separate computers.

In some embodiments, directory 220 provides directory services such as Microsoft Active Directory services and/or single sign-on services for network 190. In other embodiments, directory 220 provides extended directory services such as storing IP address pairs belonging to logically paired phones 150 and clients 120 (e.g., paired phone 150-1 and client 120-1) such that IP phone services (e.g., call forward) may be co-ordinated with session exchange services provided by session exchange 140.

The Unified Communications (UC) signaling server 230 comprises a server enabled with services, such as Session Initialization Protocol (SIP) services, to manage IP phone and/or video communications between devices on network 190 or between devices on network 190 and external networks such as the Internet. Such devices include Internet Protocol (IP) phones, video-enabled phones, software-based phone applications ("soft phones") associated with a desktop resource 108, soft phone applications associated with application server 114 or phone functionality incorporated into one or more clients 120 or other transfer devices 130. In some embodiments, UC signaling server 230 is enabled with synchronization services that enable a SIP session to utilize a SIP endpoint comprising a soft phone on a particular HDesk 112 or UC endpoint capabilities embedded in a particular client 120 or other transfer device 130. In some such embodiments, connection sequencer 470 is synchronized with UC signaling server 230 such that a SIP session can be logically paired with a remote desktop session in such a manner that when the remote desktop session is sequenced (e.g., using a 'connection forward' sequence) by session exchange 140, the paired UC endpoint is seamlessly transitioned to the new client (or new desktop in some cases).

Figure 3:
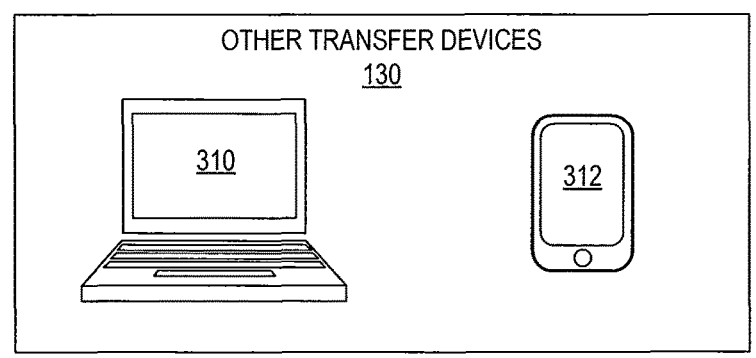
FIG. 3 illustrates an embodiment of transfer devices.

FIG. 3 illustrates various transfer devices 130 such as a portable computer 310 and a smartphone 312. In some embodiments, such transfer devices are enabled to connect to network 190 via either wireless LAN (W-LAN e.g., 802.11) or cellular (e.g., 3G or 4G data protocols).

Figure 4:
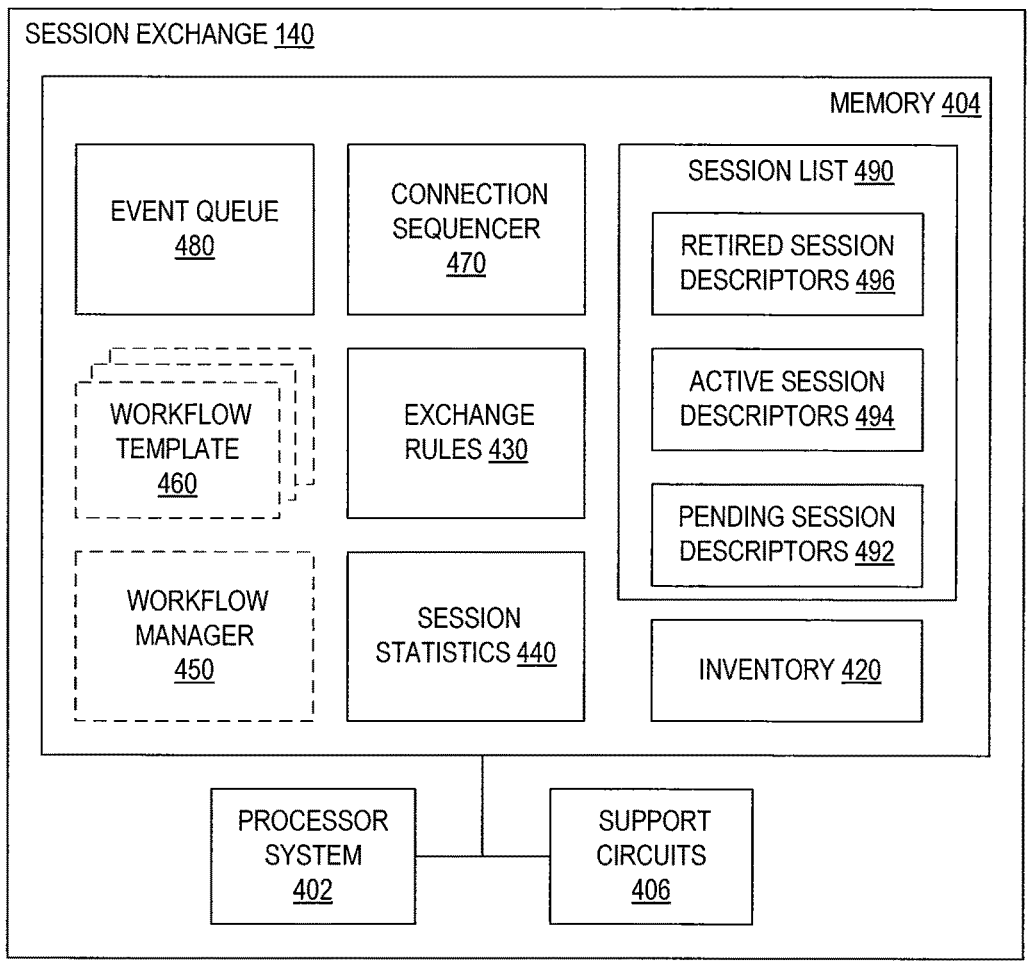
FIG. 4 illustrates selected details of an embodiment of a session exchange.

FIG. 4 illustrates an embodiment of a session exchange 140 comprising a processor system 402 (e.g., a server-class processor system) and memory 404 coupled to and supported by support circuits 406 which provides a network connection to network 190. The software components depicted in memory 404 may be applications (i.e., machine readable instructions) supported by an operating system or virtual appliances supported by hypervisor services.

Event queue 480 stores sequencing events and session exchange requests received by entities such as clients 120, HDesk 112, or UC signaling server 230 until such requests are processed by connection sequencer 470. The memory 404 also maintains a session list 490, an embodiment of which comprises properties of active remote computing sessions operating on network 190.

The connection sequencer 470 generally comprises machine executable software that manages lists or pools of users, clients 120 and desktop resources, provides connection services to facilitate the establishment of secure and authorized connections between authenticated clients and desktop resources, and orchestrates connection sequencing. Connection sequencer 470 may provide native connection management services for desktop resources 108 or, according to some embodiments, utilize connection management services provided by well-known enterprise brokers (such as VMWARE View connection server, CITRIX Delivery Controller or ERICOM Blaze) or utilize connection management services provided by service providers such as desktop-as-a-service providers. In some embodiments, connection sequencer 470 provides security gateway, network address translation and authentication services that enable clients 120 coupled to an external (e.g., public) network to be connected to desktop resources 108 on a secure network 190.

In an exemplary embodiment, the connection sequencer 470 maintains an inventory 420 (local to memory 404 or at least accessible to session exchange 140) comprising a database of clients 120 and desktop resources 108. In an embodiment, client records in inventory 420 comprise client capabilities (e.g., number of displays, display resolution, availability of peripheral devices, UC codec availability, and the like), desktop resource records comprising desktop and application capabilities (e.g., operating system, application details, processor requirements, Graphic Processing Unit (GPU) requirements, and the like). In some embodiments, inventory 420 provides storage for user preferences and administrator settings pertaining to configuration of desktop resources 108, and also storage for session attributes that enable clients 120 to configure particular user preferences for presentation of desktop resource 108 to a user at a particular client 120. Examples of such user preferences include display setup, window layout, audio, time zone, language and operating system or application personalization preferences. Examples of such administrator settings include security rules, such as encryption settings or rules that restrict select applications to select clients (or locations), or performance rules that configure desktop resources 108 according to historic use patterns for a particular user. In one such embodiment, an HDesk 112 executing on a VDI server 110 without GPU capabilities is migrated to a second VDI server 110 comprising GPU resources in conjunction with a 'desktop forward' connection sequencing event in which the initiating user was determined to not require GPU resources but the recipient user is determined to require GPU resources. Such a determination may be made via configuration preferences or automatic detection according to application or hardware use characteristics in different embodiments.

The connection sequencer 470 processes connection sequencing events from event queue 480 by utilizing exchange rules 430, an example of which is described by process 1200 below. In an embodiment, one or more pending session descriptors 492 may be created and configured in response to a processed sequencing event. A session descriptor encapsulates information about active, inactive or projected sessions between a client 120 and a desktop resource 108. In some embodiments, session descriptors are queued and sorted according to active or pending workflows. Each session descriptor generally specifies session requirements such as one or more client IP addresses as may be required for multi-client collaborative sessions, a desktop resource 108 (typically by IP address and optionally application identity information), user preferences, administrative and security settings and session timing requirements. In some embodiments, session descriptors allocate storage for maintaining workflow properties such as time stamps and performance information useful in maintaining session statistics.

When pending sessions are realized as active sessions, the associated session descriptor(s) are moved to active session descriptors 494. Once active sessions are torn down, the associated session descriptor(s) are moved to retired session descriptors 496. While some embodiments comprise a distinct session list 490, other embodiments achieve the objectives of tracking the status and pending status for users, clients and desktop resources using appropriately configured session status fields in inventory 420. Furthermore, marking sessions as 'pending', 'active' or 'retired' describes just one example of how session state may be categorized. Different embodiments may define alternative states associated with session status in order to manage session exchanges and maintain statistics.

Memory 404 further comprises session statistics 440 comprising allocated storage such as a database that maintains session history information (such as session timestamps, duration, desktop resource utilization, mobile client location information, network bandwidth usage patterns, workflow statistics associated with workflow manager 450, and the like). Such statistics may be used to monitor use patterns, optimize work flows and predict future resource and network utilization requirements.

Memory 404 may further comprise the workflow manager 450, an optional component that provides state control for complex session sequencing. In some embodiments workflow manager 450 comprises machine executable software that utilizes one or more prescribed workflow templates 460 which provide state transition templates that specify sequences. In some embodiments, desktop resources 108 are provisioned at least in part under instruction from workflow manager 450, for example responsive to a need for a client 120 to connect to a specific HDesk 112 provisioned with a customized suite of applications related to a specified workflow. In different embodiments, the workflow manager 450 may be part of the desktop resource manager 210, part of the session exchange 140 or hosted by a separate computer elsewhere on network 190. An example of a process utilizing workflow manager 450 and workflow template 460 is described by process 1300 below.

Figure 5:
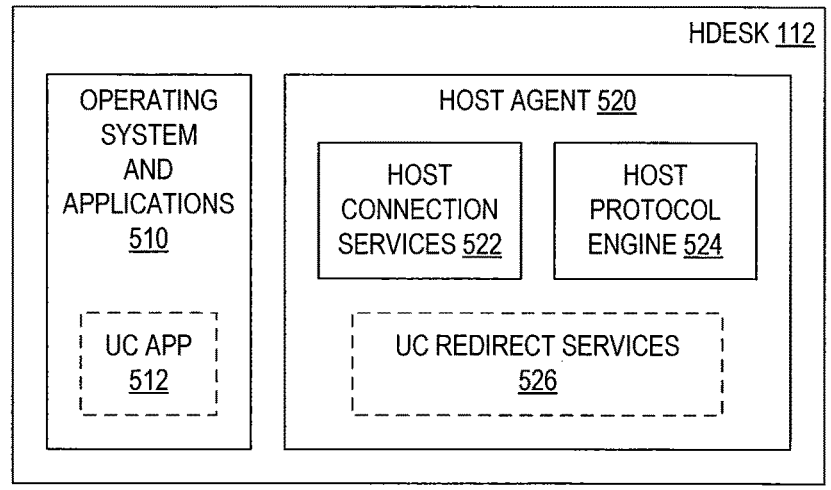
FIG. 5 illustrates selected details of an embodiment of a hosted desktop enabled for sequenced remote desktop services.

FIG. 5 illustrates selected details of an embodiment of a hosted desktop HDesk 112 comprising operating system and applications 510 (such as MICROSOFT WINDOWS and office productivity applications) and a host agent 520.

The host agent 520 comprises host connection services 522 and a host protocol engine 524. The host connection services 522 register the HDesk 112 with the session exchange 140, including provisioning of status and capability updates. In some embodiments, the connection sequencer 470 or workflow manager 450 may utilize a software application or display overlay function of HDesk 112 to provide a user with in-session connection sequence status information, such as connection requests, lists and/or status of other desktop resources (e.g., availability information pertaining to other HDesks 112 in a common pool), and the like. In other embodiments, connection sequencer 470 or workflow manager 450 communicates with connection services of a client 120 directly which allows for 'out-of-session' exchange of control and management information with the client 120. In some embodiments, the host connection services 522 provides an interface (e.g., an Application Programming Interface (API)) to the operating system for exchanging commands that prepare the desktop according to a configuration negotiated with a client 120, or specified by connection sequencer 470 or workflow manager 450 according to user profile information, preferences and/or determinations made by analysis of session statistics 440. Examples of such preparation include launching select applications, terminating other select applications, minimizing select applications, modifying the display resolution, display topology, window layout position or z-ordering (ordering of overlapping windows in a display), setting a specified application to full screen view, adjusting audio preferences, adjusting cursor sensitivity, adjusting desktop wallpaper or icon placement, setting a default printer device, setting an active network interface such as WiFi/3G, or other programmable preferences related to the operating-system.

Host protocol engine 524 provides graphics and peripheral device remoting services such as protocol version negotiation, image compression, video transcoding, USB-over-IP, audio-over-IP, data encryption (e.g., AES encryption) and protocol encapsulation (e.g., TCP/IP and/or UDP/IP) as provided by various well-known protocols such as PCOIP, HDX or RDP. In an exemplary embodiment, protocol parameters, such as image quality settings and encryption requirements, are specified in a session descriptor in accordance with exchange rules 430 and provided by session exchange 140 to HDesk 112 (or other relevant desktop resource) in conjunction with session sequencing events, thereby enabling a desktop and protocol to be automatically re-configured during a 'desktop forwarding' operation from one client 120-1 to a second client 120-2. In an embodiment, host protocol engine 524 may be configured to generate a compressed 'thumbnail view' of an HDesk 112 display image back to session exchange 140. Session exchange 140 is enabled to sort and compile lists of thumbnails which are forwarded to suitably authorized clients 120 or management computers enabling users to preview desktop resources. Such facilities are useful for production line managers or educators involved in workflow monitoring or call center staff trained to select desktop resources from a pool based on application display state as an example.

In some embodiments, HDesk 112 comprises a UC application 512 which provides services such as text messaging, Voice-Over-IP (VOIP), video conferencing, ADOBE Flash or MICROSOFT Silverlight video player support, and the like. While some variants of UC application 512 may provide media decoder capabilities (e.g., ITU G.7xx series VOIP codec, H.264 or MPEG video decoders or the like) in addition to call control (e.g., SIP call control) and/or player control functions (e.g., stream open, play pauses, and the like), it is generally preferred that UC application 512 provides call and player control functions and that the corresponding in-session client 120 is suitably enabled with media decoder capabilities to allow direct exchange of media streams which will avoid hair-pinning of the media streams through VDI server 110. In some embodiments, inventory 420 maintains a list of codec capabilities for each client 120 such that transfer of remote computing sessions comprising active media streams are preferably directed to clients 120 that meet the decoder requirements of the active media stream and avoid hair-pinning. In such embodiments, UC application 512 utilizes UC redirect services 526 to provide in-session synchronization signals to client 120.

Figure 6:
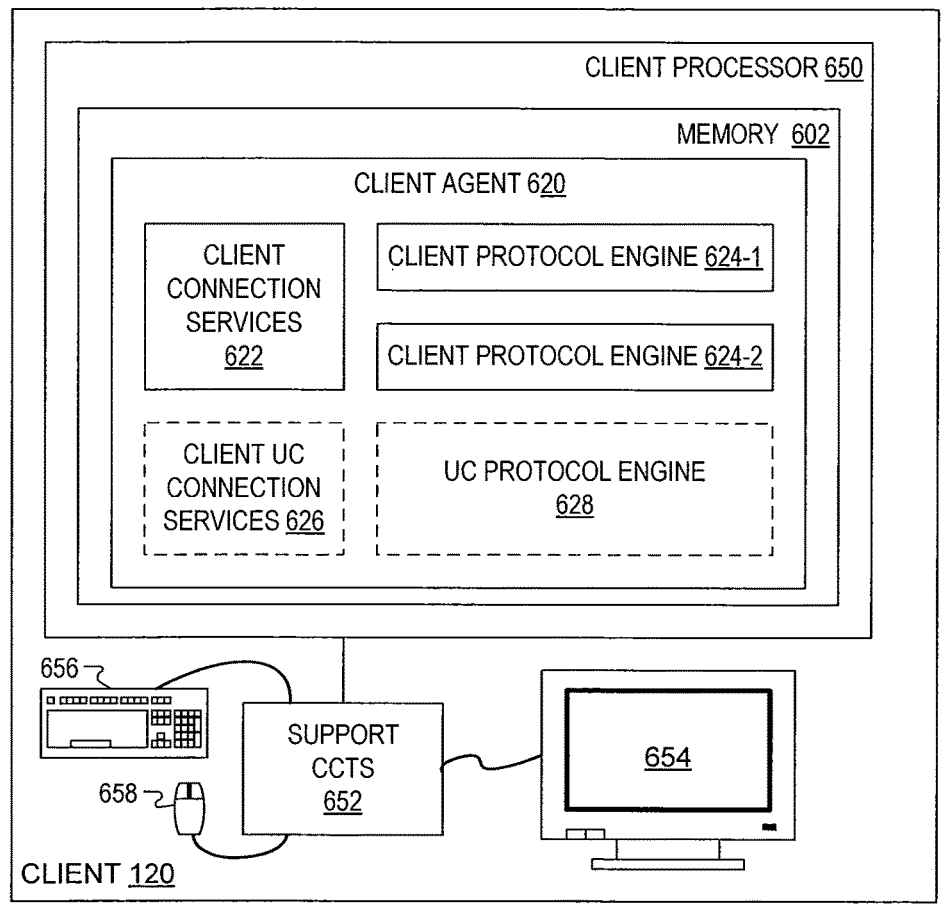
FIG. 6 illustrates selected details of a client processor enabled for connection to remote desktop resources.

FIG. 6 illustrates selected details of an embodiment of a client 120, comprising a client processor 650 with memory 602 coupled to peripheral devices including a display 654, a keyboard 656 and a mouse 658 via support circuits 652. Embodiments of client processor 650 include workstation computers, thin client terminals or zero client terminals. Alternative embodiments of client 120 may comprise any different number of displays supported by processor 650 and may further comprise additional peripheral devices such as microphone and/or speakers, printer, projection device, personal music players, webcam and the like coupled to processor 650 using an interface such as USB.

The memory 602 comprises client agent 620, which generally comprises at least one client protocol engine 624-1 that provides decoder services complementary to host protocol engine 524. In some embodiments, the client agent 620 is enabled for multi-session support with the availability of at least one additional client protocol engine 624-2. In some such embodiments, client agent 620 is enabled for simultaneous remote desktop, remote application and/or remote PC connections using different remote computing protocols. For example, client 120 may connect to HDesk 112-1 using a PCOIP protocol connection to client protocol engine 624-1 while simultaneously connected to HApp 116-1 using a XenApp/HDX connection to client protocol engine 624-2. In some embodiments, the client agent 620 also provides desktop management services that operate in conjunction with the client protocol engines 624 (i.e., client protocol engines 624-1 and 624-2), scaling resources and a graphics processor to compose different desktop and/or application sessions as movable windows on one or more displays 654. In some embodiments, protocol engines such as client protocol engine 624 and UC protocol engine 628 comprise machine executable and/or hardware-enabled protocol functions external to client agent 620. In such embodiments, client agent 620 communicates with the various protocol engines via Application Programming Interfaces (APIs), registers, shared memory resources and the like.

The client agent 620 further comprises client connection services 622. Generally, client connection services 622 provide client registration and session exchange control functions (e.g., initiation and termination of sessions, session transfers, session conferences and workflow sequences) that enable client 120 to connect to one or more specified desktop resources and present one or several simultaneous remote desktops, remote applications or local applications (e.g., using reverse seamless approaches) to client 120 for display.

Client connection services 622 registers the client 120 with the session exchange 140 and initiates or responds to requests from connection sequencer 470 to establish or tear down remote sessions with one or more desktop resources 108 as part of a session sequence. In some embodiments, a local session may be established between client agent 620 and an operating system local to client processor 650 or a local device such as a smartphone or tablet device plugged into client processor 650.

Other client connection services of particular relevance to zero client technologies in which the operating system local to client processor 650 is primitive include user login functions, local menu provisions that enable users to initiate and respond to session exchange events, and a browser or user interface that enables a user to select client topology or configuration preferences (e.g., keyboard language preferences) and window layout for subsequent retrieval at the same client 120 or replication on a different client 120.

In various embodiments in which client 120 is enabled for unified communications, client agent 620 includes client UC connection services 626 supported by UC protocol engine 628. Client UC connection services 626 are generally supported by UC signaling server 230 and address and/or registration services provided by directory 220. Client UC connection services 626 are communicatively coupled to UC redirect services 526 to facilitate the separation of control and data planes. In a first embodiment in which a direct connection between client agent 620 and a remote UC device comprises both control plane and data plane information, client UC connection services 626 operate as a conduit for control plane information (e.g., SIP signaling commands) between the remote UC device and the desktop resource 108 enabled to terminate the signaling. In an exemplary case, protocol parameters such as image quality settings and encryption requirements are specified in a session descriptor in accordance with exchange rules 430 and provided by session exchange 140 to client 120 using client connection services 622.

In some embodiments in which the direct connection is between host agent 520 and a remote UC device, client UC connection services 626 operate to feed media received in conjunction with UC redirect services 526 to UC protocol engine 628 or, in an embodiment comprising egress media such as data from a webcam local to client 120, encapsulate the egress stream encoded by UC protocol engine 628 and forward it to a specified UC endpoint. Some embodiments of UC protocol engine 628 comprise additional video conferencing features such as VOIP codecs, echo cancellation, gesturing, gaze detection, image recognition services or the like.

Figure 7:
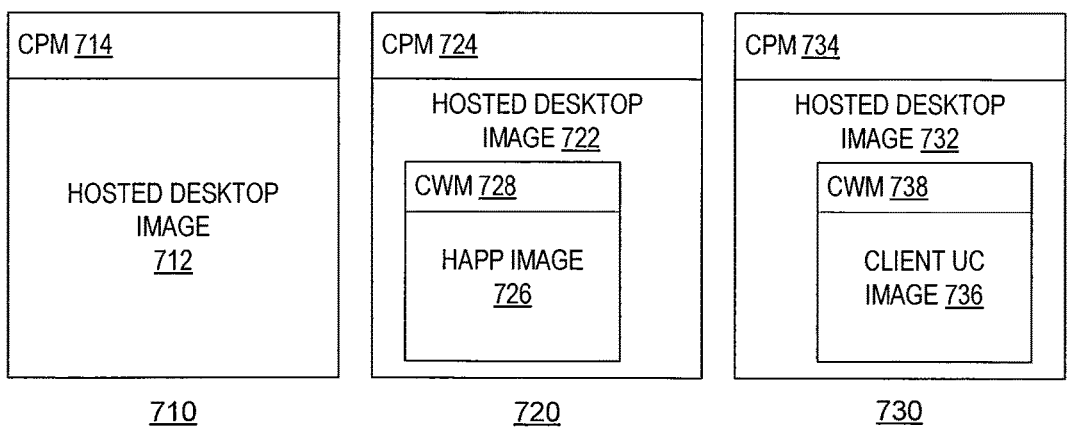
FIG. 7 illustrates desktop compositions including host rendered desktop with client parent menu, host rendered application with client window menu and client unified communications window with client window menu.

FIG. 7 depicts a series of desktop image display representations 710, 720, and 730 for presentation on display 654 according to one or more embodiments. Display representations 710, 720 and 730, composed by client agent 620, are of particular value to lightweight client processor technologies such as zero clients and some thin client processors that lack sophisticated operating systems and desktop windows management (DWM) services. Display representations 710, 720 and 730 include client-rendered interaction menus which, in an embodiment, serve as a user interface to session exchange 140 and facilitate connection sequencing operations.

Display representation 710 comprises hosted desktop image 712 such as a WINDOWS desktop which, in an embodiment, comprises a desktop display image rendered by HDesk 112-1 on VDI server 110, compressed by a host protocol engine 524 and transmitted to client 120-1. In such an embodiment, the client 120-1 renders client parent menu (CPM) 714 which incorporates controls that enable sequencing of connections. CPM 714 may be rendered as an alpha-blended overlay image such as a pop-up box or drop-down menu activated by a predetermined key sequence on keyboard 656, dedicated buttons on client 120-1, an overlay icon presented on display 654 or mapped to the display menu of a desktop phone paired with client 120-1. In one embodiment, an overlay icon or predetermined key sequence toggles the display layout between a primary view of hosted desktop image 712 and a primary view comprising CPM 714 in which hosted desktop image 712 may be represented in thumbnail format, for example to the side or corner of display 654. In an exemplary embodiment useful for customer service or call center applications, CPM 714 comprises a set of action buttons (e.g., 'Desktop Forward' and 'Desktop Collaborate') and a set of status indicators (e.g., 'Desktop Waiting', 'Desktop on Hold'). When a 'Desktop Forward' button is pressed, connection sequencer 470 is notified of the request and may in response present the user with a directory of users, clients or a designated pool available to receive the desktop. Correspondingly, a status indicator illuminates to notify a user that a desktop is waiting to be received. In an embodiment, a user is enabled to interact with a 'Desktop Waiting' indicator. For example, by pressing an associated button, the user is presented with a list of one or more desktops available for connection as determined by the pending session descriptors 492. In some embodiments, the user is presented with thumbnail representations of 'waiting' desktops to facilitate selection.

Display representation 720 comprises hosted desktop image 722, such as a WINDOWS desktop similar to hosted desktop image 712, and CPM 724 which provides comparable functionality to CPM 714 described above. Display representation 720 further comprises hosted application image HApp image 726 which, in an embodiment, comprises an application display image rendered by HApp 116-1 on application server 114, compressed and transmitted to client 120-1 which decodes and composes the image with hosted desktop image 722. In such an embodiment, the client 120-1 renders client window menu (CWM) 728 which incorporates controls that enable sequencing of connections specifically related to published applications. CWM 728 may be rendered in a similar fashion to CPM 714 described. In an exemplary embodiment CWM 728 also comprises a set of action buttons (e.g., 'Application Forward' and 'Application Collaborate') and a set of status indicators (e.g., 'Application Waiting', 'Application on Hold'). When an 'Application Forward' button is pressed, connection sequencer 470 is notified of the request and may in response present the user with a directory of users, clients or a designated pool available to receive the application. Correspondingly, a status indicator illuminates to notify a user that an application is waiting to be received. In an embodiment, a user is enabled to interact with an 'Application Waiting' indicator. For example, by pressing an associated button, the user is presented with a list of one or more applications available for connection as determined by the pending session descriptors 492. In some embodiments, the user is presented with thumbnail representations of 'waiting' applications to facilitate selection. Exchange rules 430 may be used to prescribe an association between hosted desktop image 722 and hosted application image HApp image 726. For example in some embodiments, an application is designated to automatically follow a desktop exchange sequence; in other embodiments, a desktop is designated to automatically follow an application session exchange sequence and in still other embodiments, desktop and application sessions are independently sequenced.

Display representation 730 comprises hosted desktop image 732, such as a WINDOWS desktop similar to hosted desktop image 712, and CPM 734 which provides comparable functionality to CPM 714 described above. Display representation 730 further comprises client UC image 736 which, in an embodiment, comprises a video conferencing window generated by UC protocol engine 628 supported by client window menu (CWM) 738. In some embodiments, CWM 738 provides UC interactivity and UC call control with UC signaling server 230 (typically via UC redirect services such as UC redirect services 526) and/or an HApp 116 comprising UC functionality (e.g., functionality comparable to UC App 512) on an application server 114. One variation to display representation CWM 738 comprises a host-rendered CWM 738, for example CWM 738 rendered by the desktop resource tasked with rendering hosted desktop image 732.

Exchange rules 430 may be used to prescribe an association between hosted desktop image 732 and client UC image 736. For example in some embodiments, a UC session is designated to automatically follow a desktop exchange sequence; in other embodiments, a desktop is designated to automatically follow a UC session exchange sequence and in still other embodiments, desktop and UC sessions are independently sequenced. In other embodiments in which display representation comprise both a client UC image 736 and one or more application images (e.g., HApp image 726), exchange rules 430 may be used to prescribe an association between a specific application and client UC image 736.

Figure 8:
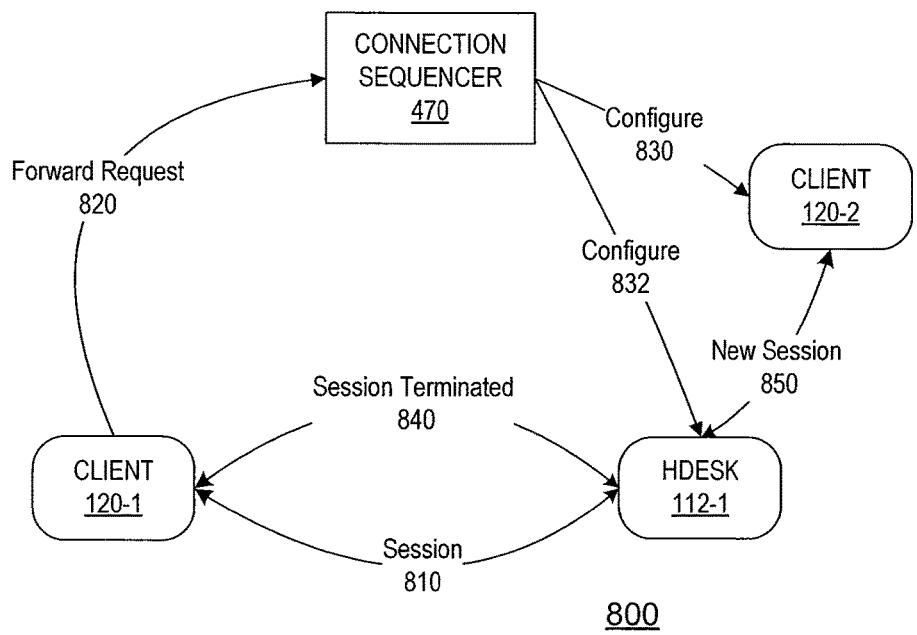
FIG. 8 illustrates a connection sequence associated with a session forwarding operation initiated by a client.

FIG. 8 depicts an embodiment of a connection sequence 800 describing the sequence of events and operations associated with a desktop transfer or "forwarding" of a desktop resource such as an HDesk 112 or an HApp 116, for example as initiated by a client 120, other transfer device, phone, UC signaling server or desktop resource in different embodiments. The connection sequence 800 may be enacted by a connection sequence such as process 1200 described below. In the exemplary client-initiated sequence 800, the CLIENT 120-1 which is in an established SESSION 810 with HDesk 112-1 initiates the connection sequence 800 with a FORWARD REQUEST 820 ("request 820") which is dispatched to the connection sequencer 470. The connection sequencer 470 parses the request 820 against exchange rules 430 and may present the client 120-1 with a directory of authorized clients 120, or clients 120 that meet specified capabilities, or in an embodiment comprising production-oriented workflow, the connection transition from client 120-1 to client 120-2 may be preconfigured. The connection sequencer 470 configures the client 120-2 (ref. CONFIGURE 830), typically by passing it address information for HDesk 112-1 which may comprise providing an IP address of connection sequencer 470 or another connection broker to client 120-2 in conjunction with the unique host name of HDesk 112-1 in order for client 120-2 to establish a session. Alternatively, in some embodiments, connection sequencer 470 may pass client 120-2 the address of HDesk 112-1 to enable a direct connection between client 120-2 and HDesk 112-1. A user at client 120-2 may be notified of the "waiting desktop" via CPM 714. The connection sequencer 470 may also reconfigure the HDesk 112-1 (ref. CONFIGURE 832), for example by communicating topology preferences and/or user profile information (e.g. as stored in inventory 420) associated with the user at client 120-2.

At a given time, the user at client 120-2 accepts the "waiting desktop" in which case the session between client 120-1 and HDesk 112-1 is typically terminated (ref. SESSION TERMINATED 840) and a NEW SESSION 850 established between client 120-2 and HDesk 112-1. In various collaboration embodiments such as an education or training environment in which a trainer at client 120-1 wishes to monitor the new session 850, the original session 810 may be maintained.

While connection sequence 800 provides a desktop transfer service, several other exchange services for desktop resources are based on variations of sequence 800.

In one embodiment, a call diversion service is provided in the event configuration action 830 fails, for example in embodiments where client 120-2 is unregistered or registered to connection sequencer 470 as unavailable (as might be the case if a user at client 120-2 explicitly registers the client 120-2 as unavailable or registers the client 120-2 as in-session with a different HDesk 112). The call diversion service then facilitates an alternate connection such as configuration of a different client 120-3. In an embodiment, connection sequencer 470 messages the user at client 120-2 via an alternate device such as a display message or ringtone at phone 150 or text message to mobile device 312 via UC signaling server 230.

In another embodiment, a ring back service is provided for client 120-2 if client 120-2 is unavailable. One way to achieve this is to preconfigure client 120-2 with address information (to contact either connection sequencer 470 or HDesk 112-1) and an indicator that a connection to a desktop resource 108 is pending without necessarily establishing a connection until the user at client 120-2 is available. In another embodiment, a ring back service or a reminder service is provided for client 120-1, for example if a user at client 120-1 wishes to terminate the session with HDesk 112-1 and re-establish it at a later time, either from client 120-1 or another client 120. In such an embodiment, forward request 820 comprises contact time and client identity information. In different embodiments, such a ring back may comprise automatic reestablishment of the connection initiated by connection sequencer 470 or provisioning of an indicator showing a pending connection so as to enforce user authentication prior to reconnection.

In yet another embodiment, group pickup services are provided by configuring a plurality of clients 120 for simultaneous connection as might be used when the user at client 120-1 wishes to broadcast a software presentation hosted by HDesk 112-1 to multiple users. In other embodiments, hotline services are provided by connection sequencer 470 that facilitate automatic connections between a client 120 and designated desktop resources when the client registers on network 190.

Figure 9:
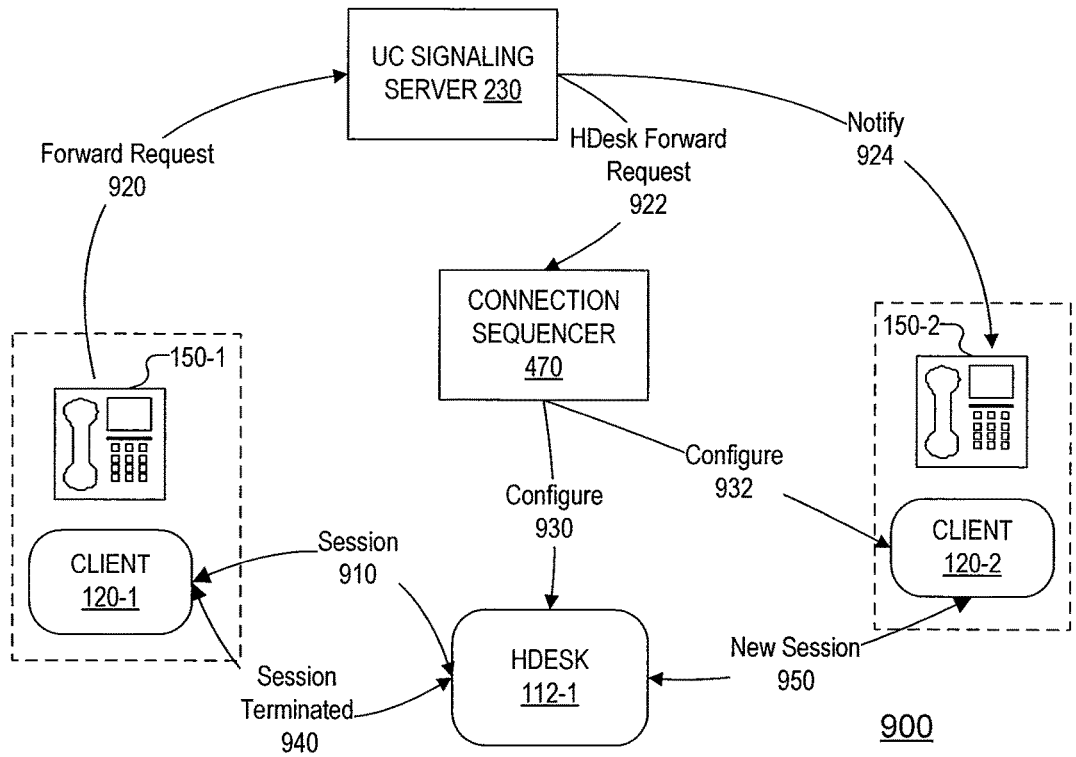
FIG. 9 illustrates a connection sequence associated with a session forwarding operation initiated by a phone.

FIG. 9 depicts an embodiment of a desktop transfer connection sequence 900 describing the sequence of events and operations associated with "forwarding" of a desktop resource 108 such as an HDesk 112 or an HApp 116 synchronized to a client-initiated call transfer request from a transfer device such as a desktop phone or alternative (typically local) logically paired network device. The connection sequence 900 may be enacted by connection sequence process 1200 described below. The CLIENT 120-1 is in an established SESSION 910 with HDesk 112-1 at the same time as a paired IP phone 150-1 has a connection to a calling party on an external network as an example.

The user initiates the desktop transfer connection sequence 900 with a FORWARD REQUEST 920 from phone 150-1 which is dispatched to the UC signaling server 230. The UC signaling server 230 sends HDESK FORWARD REQUEST 922 to connection sequencer 470 which parses the request, identifies the client 120-2 associated with the phone 150-2 and configures the client 120-2 (ref. CONFIGURE 932) and the HDesk 112-1 (ref. CONFIGURE 930). The UC signaling server 230 notifies the phone 150-2 of the waiting call (ref. NOTIFY 924).

At a given time, the user at client 120-2 accepts the waiting call, for example by answering the phone or pressing a menu option on the phone. The UC signaling server 230 notifies the connection sequencer 470 which typically prompts for the termination of the original session (ref. SESSION TERMINATED 940) following which the client 120-2 initiates NEW SESSION 950 with HDesk 112-1. In various embodiments the original session 910 may be maintained as described for connection sequence 800.

A variation on connection sequence 900 comprises a display wall, display grid or other such display arrangement under management of a smartphone 312. The overall image generated by the display arrangement is composed by a set of clients 120 (and corresponding displays 654) each client 120 connected to a desktop resource 108 associated with a partial rendering of the overall image. Smartphone 312 is enabled with application software (i.e., an app) for transferring desktop resources 108 using an automated set of forward requests communicated to connection sequencer 470 that enable the display arrangement to be dynamically re-configured. For example, responsive to rearranging 'display icons' on smartphone 312. Each new arrangement triggers connection sequencer 470 to form a new mapping between desktop resources 108 and clients 120.

Figure 10:
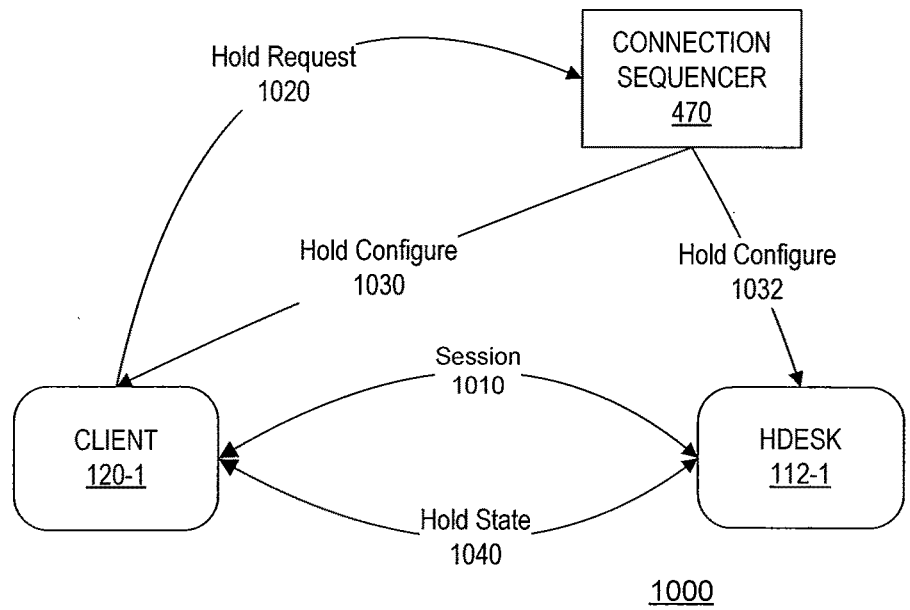
FIG. 10 illustrates a connection sequence associated with session hold and pickup operations.

FIG. 10 depicts connection sequence 1000 comprising a sequence of events and operations associated with a client-initiated call hold operation of a desktop resource such as an HDesk 112 or an HApp 116 in accordance with an embodiment of the present invention. The connection sequence 1000 may be enacted by connection sequence process 1200 described below. The client 120-1 which is in an established SESSION 1010 with HDesk 112-1 initiates the connection sequence 1000 with a HOLD REQUEST 1020 which is dispatched to the connection sequencer 470. The connection sequencer 470 configures the client 120-1 (ref. HOLD CONFIGURE 1030), which in an embodiment, may comprise client 120-1 terminating the session 1010 and connection sequencer 470 retiring an active session descriptor 494 and generating a new pending session descriptor 492 signaling HDesk 112-1 available to a designated pool of users. The connection sequencer 470 may also reconfigure the HDesk 112-1 (ref. HOLD CONFIGURE 1032), which may comprise reconfiguring application software on HDesk 112-1. In some embodiments such as an HDesk 112-1 comprising a client UC window (ref. display representation 730), connection sequencer 470 notifies UC signaling server 230 of a connection hold event associated with the client UC window. At this point, a client 120 (either the original CLIENT 120-1 or a different client such as client 120-2) can initiate a PICKUP REQUEST which triggers a new session with HDesk 112-1. In an alternative to connection sequence 1000, hold request 1020 is initiated by a transfer device (e.g., a phone 150-1) logically paired with client 120-1. In such an embodiment, the UC Signalling Server 230 manages messaging between transfer devices and connection sequencer 470.

Figure 11:
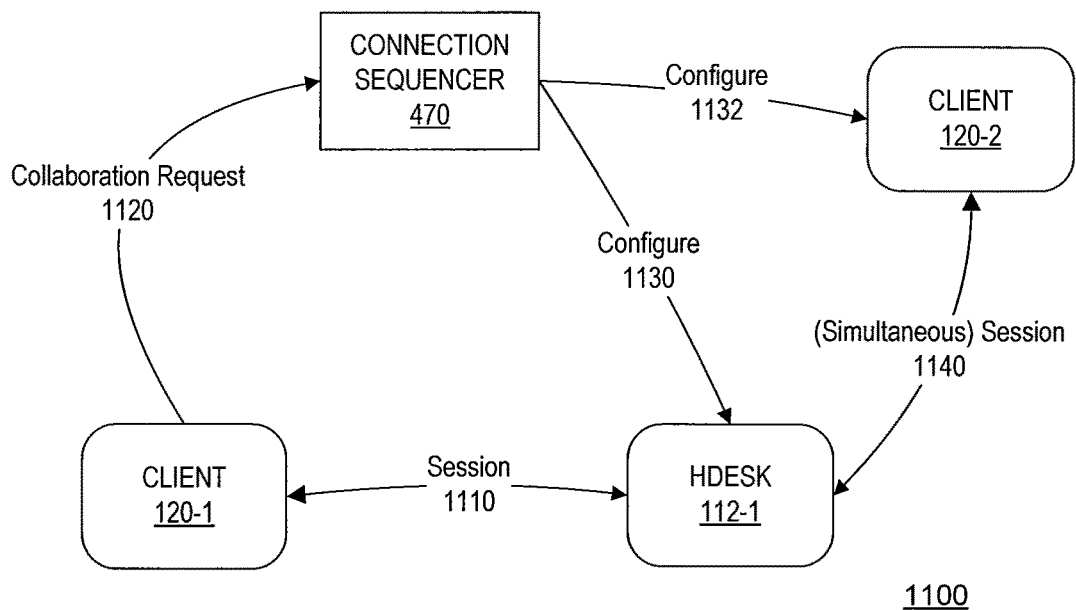
FIG. 11 illustrates a connection sequence associated with a collaboration sequence.

FIG. 11 depicts connection sequence 1100 comprising a sequence of events and operations that enable collaboration (i.e., simultaneous multi-user access) to a desktop resource 108 in accordance with an embodiment of the present invention. The connection sequence 1100 may be enacted by connection sequence process 1200 described below. The client 120-1 which is in an established SESSION 1110 with HDesk 112-1 initiates the connection sequence with a COLLABORATION REQUEST 1120 which is dispatched to the connection sequencer 470. The connection sequencer 470 parses the request 1120 against exchange rules 430 and may present the client 120-1 with a directory of authorized clients listed or specific collaboration topologies may be preconfigured. In some alternative embodiments, the COLLABORATION REQUEST 1120 may be initiated from a different client 120 such as client 120-2 in which case the client 120-2 may be presented with a list of desktop resources 108 available for collaboration. The connection sequencer 470 configures the client 120-2 (ref. CONFIGURE 1132), typically by passing it address information for HDesk 112-1. The address information may comprise an IP address of connection sequencer 470 or another connection broker in conjunction with the unique host name of HDesk 112-1 in order for client 120-2 to establish a session. Alternatively, in some embodiments, connection sequencer 470 may pass client 120-2 the address of HDesk 112-1 to enable a direct connection between client 120-2 and HDesk 112-1. A user at client 120-1 may be notified of connection status for the second and/or additional clients 120 via CPM 714. The connection sequencer 470 may also reconfigure the HDesk 112-1 (ref. CONFIGURE 1130), for example by reconfiguring application software of the desktop resource 108. At this point, a second simultaneous SESSION 1140 is established between client 120-2 and HDesk 112-1. In one alternative embodiment of particular use to 'desktop conferencing', a client 120-1 (which may be out-of-session) contacts connection sequencer 470 to establish a collaborative session. Connection sequencer 470 then contacts desktop resource manager 210 to instantiate desktop resources 108 such as one or more HDesks 112 and/or HApps 116. Once the desktop resources 108 are available, the connection sequencer 470 triggers simultaneous sessions between the desktop resource 108 and all of the client endpoints which have been configured to participate in the collaborative session. In an alternative to connection sequence 1100, collaboration request 1120 is initiated by a transfer device (e.g., a phone 150-1) logically paired with client 120-1. In such an embodiment, the UC Signalling Server 230 manages messaging between transfer devices and connection sequencer 470.

Figure 12:
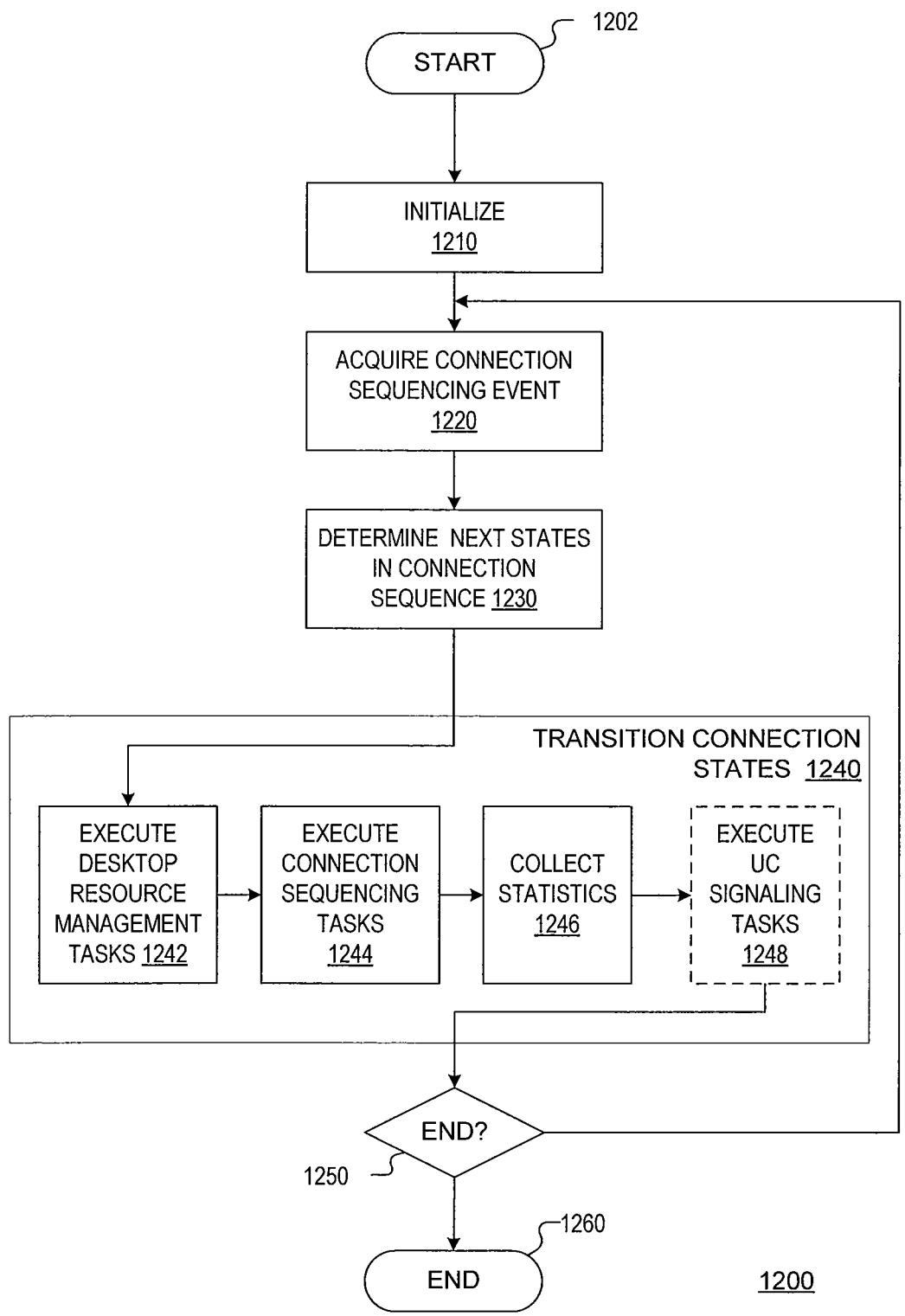
FIG. 12 illustrates an embodiment of a process for acquiring connection sequencing events and transitioning connection states.

FIG. 12 depicts a process 1200 for transitioning connections to desktop resources, generally in response to events received from any of several sources dependent on the application scenario, in accordance with an embodiment of the present invention. Connections to desktop resources (e.g., desktop resources 108) may be dynamically transitioned, for example as users use H Desk 112 or HApp 116 sessions to complete ad hoc tasks such as using office productivity software or alternatively, desktop resources may be sequenced according to a workflow template 460 which specifies state progression through a workflow such as call center workflow (ref. workflow template 1400), production workflow (ref. production template 1500) or education workflow (ref. workflow template 1600) described below.

Process 1200 starts at step 1202 and proceeds to step 1210 ('Initialize') in which session exchange 140 is configured. Such configuration may include collecting an inventory 420 comprising registered clients (e.g., clients registered on network 190), users (e.g., users registered with a directory 220), and desktop resources (e.g., HDesk 112 and HApp 116 resources available to desktop resource manager 210 which may include instantiated virtual machines and applications and/or disk images of virtual machines and applications available for cloning). Exchange rules 430 including policies such as operating policies, permissions, logical pairings between transfer devices and clients (e.g., localized client/phone associations), and security rules, are loaded. Logical pairings between transfer devices and clients may be used to identify a particular client 150 from the identity of a particular transfer device (e.g. IP phone 150). In some embodiments comprising complex connection sequences, one or more workflow templates 460 are loaded. In select embodiments, session exchange or session sequencing is accelerated by pre-configuring desktop resources 108 and clients 120 with session parameters in order to reduce the required number of negotiation messages necessary at the instant a new session is requested. As an example, trust is established at the time desktop resources 108 and clients 120 are registered with session exchange 140 (i.e., configuration steps 830, 832, 930, 932, 1130 and 1132 are partially completed during an initialization phase). In some cases, encryption keys such as AES-256 keys are exchanged between trusted endpoints and locally stored (optionally in an encrypted format for security purposes) as a further initialization step. Then, when a new session is requested, encrypted communications between a desktop resource 108 and a selected client 120 can commence with limited or no further session negotiations.

Process 1200 proceeds to step 1220 (Acquire Connection Sequencing Event') which is the start of an event processing loop that responds to connection sequencing events. In an embodiment, various events such as UC events received from UC signaling server 230 (e.g., request 922 or other SIP events related to an HDesk 112 or HApp 116 paired with a UC client), client registration events, sequencing requests (e.g., requests 820, 922 or 1020) events, connection brokering events such as initial session requests (e.g., establishment of session 810), client topology or location changes, directory service event, operations or timer events related to in-progress workflows, administrative events such as security policy changes or administrator-initiated desktop resource take-over or collaboration requests, or other events which will trigger a connection sequence transition are queued in event queue 480 of session exchange 140 (typically asynchronous to process 1200) and extracted at step 1220 by event processing functions such as connection sequencer 470 or workflow manager 450.

As a next step 1230 ('Determine Next States in Connection Sequence'), process 1200 parses the acquired event, determines action(s) to take in response to the acquired event and issues instructions for execution at step 1240, for example as one or more RPCs (Remote Procedure Calls) issued for execution by processing elements of system 100. An embodiment of step 1230 utilizing workflow templates is detailed as process 1300 described below.

As a next step 1240 ('Transition Connection States'), which comprises steps 1242, 1244, 1246, and (optionally) 1248 described below, connection states are transitioned by executing at least one of i) desktop resource management, ii) connection management, iii) statistics collection or iv) UC signaling tasks.

At step 1242 ('Execute Desktop Resource Management Tasks'), desktop resources 108 may be configured by desktop resource manager 210 in preparation for connection. Examples of such configuration include cloning and initialization of virtual machines, configuration of application software and personalization of desktops to suit user requirements. In some embodiments, desktop resource manager 210 may execute post-processing functions on a desktop resource 108 following termination of a session. Post-processing may include extraction of application data from the domain of the desktop resource and data analysis functions. As a specific example in an education test setting or production farm, desktop resource manager 210 generates a set of HDesks 112, each HDesk 112 designated for a specified users. Each HDesk 112 comprises a pre-configured suite of software applications. Each user at a separate client 120 initiates a session with a designated HDesk 112, performs a specified set of tasks and ends the session. At step 1242, desktop resource manager 210 executes a script or software program that extracts the exit state (i.e., end-of-session state) of each HDesk 112 and generates a report listing differences between an expected exit state and actual exit state.

At step 1244 ('Execute Connection Sequencing Tasks'), configuration, sequencing and/or connection management tasks (such as tasks responsive to instructions 830, 832, 930, 932, 1030, 1032, 1130 and 1132) are executed, including session initialization and session termination. In some embodiments, connection management tasks are at least in part determined by pending and active session descriptors 492 and 494 such that sessions are initiated or terminated based on timing requirements specified in the session descriptors. In some embodiments in which transfer devices are logically paired with clients, step 1244 further comprises configuring the related transfer devices in conjunction with session initialization and termination tasks.

At step 1246 ('Collect Statistics'), information regarding connection and workflow state is gathered. In an exemplary call center embodiment, the length of time and time of day associated with pending and active sessions is recorded to make determinations on responsiveness of call center agents, complexity of customer interactions, capacity planning and so on. In other embodiments, exchange rule violations are recorded for security auditing purposes. In another embodiment, statistics for the event queue 480 (e.g., time of arrival and time of processing) are gathered to facilitate future scaling of the session exchange 140.

At optional step 1248 ('Execute UC Signaling Tasks'), the UC signaling server 230 executes instructions received from connection sequencer 470 such as UC 'application forwarding' synchronized to 'desktop forwarding'. Such operations may involve configuration of new UC client endpoints (e.g., applying configurations and addressing maintained by the forwarding party to the forwarding recipient and graceful redirection of a UC endpoint from the forwarding party to the forwarding recipient).

At step 1250, a determination is made whether to end, and process 1200 either returns to step 1220 to acquire the next event or ends at step 1260, for example in the event session exchange 140 is shut down.

Figure 13:
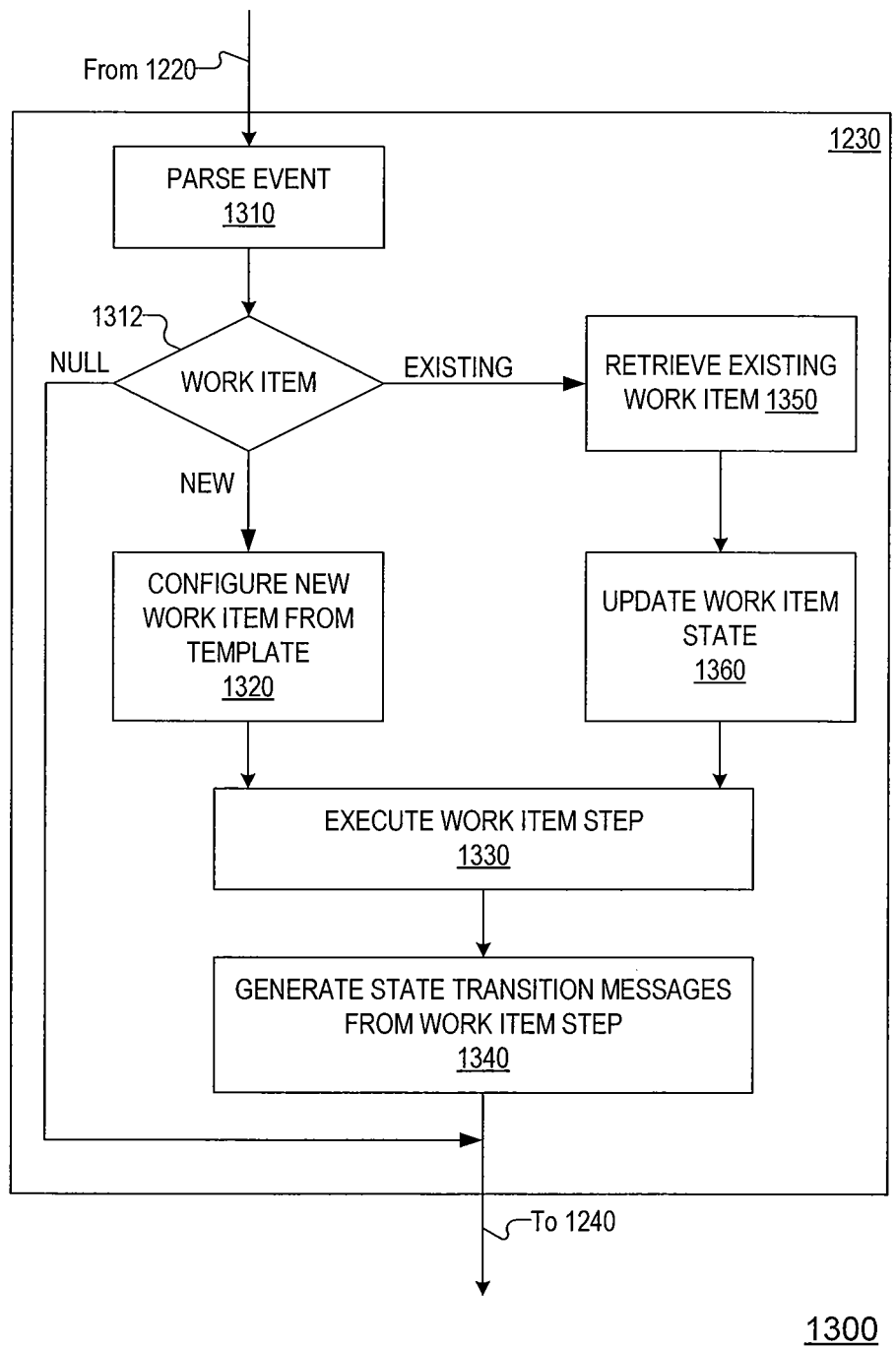
FIG. 13 illustrates an embodiment of a work flow step process.

FIG. 13 depicts workflow step process 1300 which is an embodiment of the step 1230, executed for example by a workflow manager 450. Process 1300 occurs in embodiments which use a work flow template 460 such as a call center workflow template 1400, a production workflow template 1500 or an education workflow template 1600 deployment.

As a first step 1310 ('Parse Event'), a connection sequencing event acquired at step 1220 is parsed and validated; if at decision point 1312 it is determined that the event is unrelated to a workflow, process 1300 exits. If at decision point 1312 it is determined that a new work item should be initiated, process 1300 proceeds to step 1320. At step 1320 ('Configure New Work Item from Template'), a new work item (i.e., an instantiation of a workflow template comprising a software method and state information) is instantiated from a workflow template 460 and configured based on the data associated with the acquired sequencing event. If, at decision point 1312 it is determined that a work item related to the event exists, the existing work item is retrieved at step 1350 ('Retrieve Existing Work Item') and work item state updated at step 1360 ('Update Work Item State') based on data associated with the acquired sequencing event and the states of the participants as stored with the work item.

At step 1330 ('Execute Work Item Step'), the next listed work item step is executed for either the newly configured work item or the retrieved and updated work item.

At step 1340 ('Generate State Transition Messages from Work Step'), a list of sequencing messages and RPCs is generated and dispatched for execution at step 1240. Note that the event acquired at step 1220 may simply correspond to a state update from one or more of the participants associated with a work item—e.g., desktop resource manager 210 may report back to workflow manager 450 that a requested HDesk 112 has been instantiated and configured. Such events generally result in data updates within a work item but may not necessarily generate any further messages or RPCs immediately.

Figure 14:
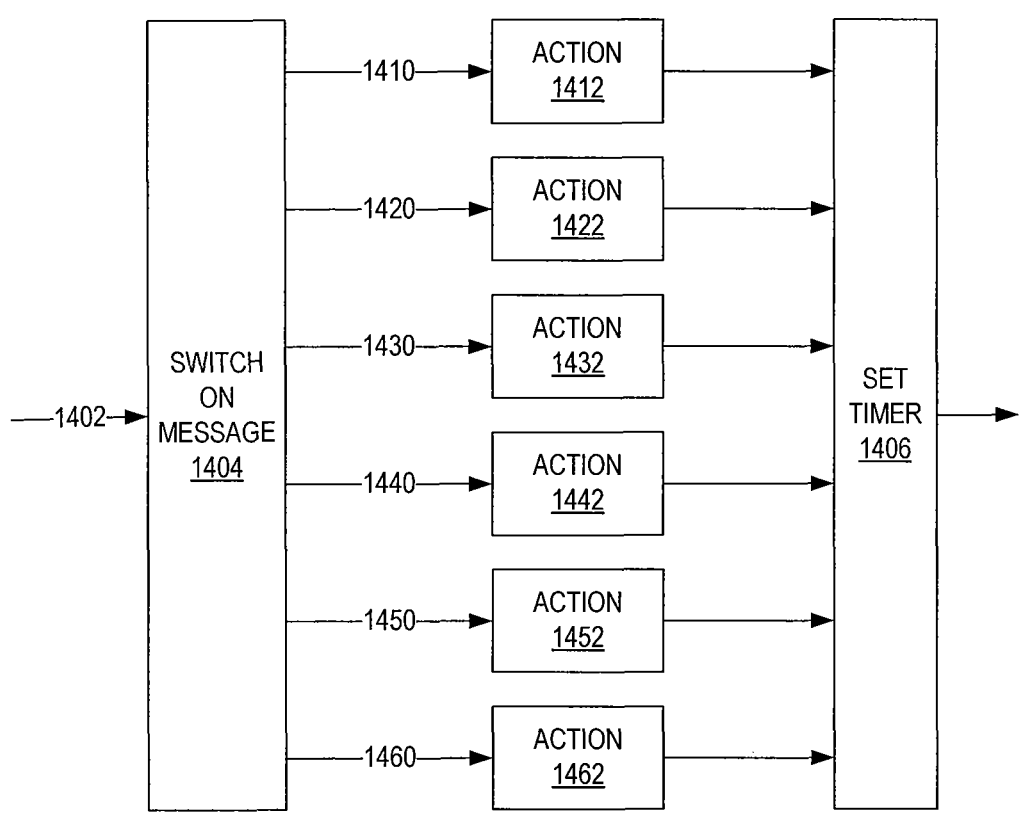
FIG. 14 illustrates an embodiment of a workflow template for a call center.

FIG. 14 depicts an exemplary workflow template 1400 for a call center connection sequence to demonstrate how a work item may be utilized by workflow manager 450. In such a customer service call center embodiment, desktop resources 108 are associated with inbound customer phone or video calls and delegated to call agents via a desktop resource pending session queue. When a call agent becomes available, the call agent's client 120 establishes a session with the next desktop resource 108 in the pending session queue in order to "handle the call". On call completion, the session is torn down and associated resources are reclaimed.

Once workflow template 1400 is instantiated as a work item, data necessary for processing the connection sequence becomes associated, managed and stored in conjunction with the work item, for example through association with one or more session descriptors. Such data may comprise the state of participants (e.g., call agent participants described by session descriptors in session list 490), information on how to contact, query and update the participants and the like.

Referring to FIG. 14, an incoming message 1402 is tested against a number of message options at step 1404. A particular message match then determines the state and configuration updates necessary to advance the scenario, the actions to be taken and the RPCs (if necessary) and/or session descriptors required to effect them.

In the event of an "Incoming call" message 1410, action 1412 comprises dispatching an RPC to DRM 210 to instantiate an HDesk 112, for example from a VM template. An incoming call message 1410 may be posted by UC signaling server 230 in conjunction with an incoming phone call routed to an incoming call manager.

In the event of a "VM setup complete" message 1420, action 1422 comprises:
  i) Creating a session descriptor; and
  ii) Placing the session descriptor in pending session descriptors 492.

In the event of an "Agent available" message 1430, action 1432 (for example as signaled by a call agent ready to handle a call) comprises:
  i) Retrieving the session descriptor from pending session descriptors 492;
  ii) Updating the session descriptor with topology information, security policies, and user preferences (e.g., personalization) associated with the available call agent and client 120 associated with the available call agent; and
  iii) Instructing connection sequencer 470 and/or DRM 210 to configure the client 120 associated with the call agent and the HDesk 112 according to the updated session descriptor. Such instructions may be issued using RPCs and/or setting priority requirements in the session descriptor. In some embodiments, HDesk 112 is tailored according to requirements of expressly identified incoming calls such as application configuration based on call history, time zone, language preferences, customer database configuration and the like.

In the event of a "Client and HDesk configured for session" message 1440, action 1442 comprises:
  i) Instructing connection sequencer 470 to establish a session between client 120 and HDesk 112 (e.g., using RPC or session descriptor status field); and
  ii) Moving the session descriptor to the active session descriptors 494. (Note that in an embodiment, workflow manager 450 is tasked with creating session descriptors and adding them to pending session queue 492 but connection sequencer 470 is responsible for moving session descriptors to active session list 494 only once the session is active).

In some embodiments, action 1442 further comprises sending a 'call waiting' associated with the incoming caller to client UC connection services 626 or automatically establishing a UC session or VoIP call between the calling party and UC-enabled client. In other embodiments, action 1442 comprises instructing UC signaling server 230 to send a 'call waiting' signal associated with the incoming caller to a phone 150 once the remote computing session is active.

In the event of a "Call complete" message 1450, action 1452 comprises:

i) Instructing connection sequencer 470 to tear down the session;

ii) Updating the session statistics 440 which may also comprise capturing and logging application state information associated with HDesk 112 in association with the call identity;

iii) Placing the session descriptor in retired session descriptors 496; and iv) Instructing DRM 210 to reclaim HDesk 112.

In the event of a "Timeout" message 1460, action 1462 comprises determining the process(es) causing the timeout, rectifying error conditions and re-initiating or gracefully terminating process(es) in error state.

Generally, step 1406 (which follows each of actions 1412, 1422, 1432, 1442, 1452, and 1462) comprises setting timer functions to enable progression monitoring and error management following the dispatch of RPCs or other remotely executed processes.

Workflow template 1400 described embodies just one of many call center work flows and variations may comprise fewer or more events. For example, one variation determines the call agent based on gathered statistics. In such an embodiment, additional messages are defined to enable statistics processing and call agent matching functions. Such work flow functions may include determining profiles for calling parties (e.g., technical attributes, historic issue resolution metrics such as time to resolution and customer satisfaction, previous call agent relationships and so on), determining profiles for call agents (e.g., technical expertise, issue resolution metrics, customer relationship scores and so on), and matching a calling party to a user agents according to statistics, for example by correlating the profiles and selecting the most suitable agent. Other variations provide desktop monitoring or archival services useful in call agent training or determining quality of service. In an embodiment, desktop monitoring is accomplished by specifying events that orchestrate a second simultaneous session from the HDesk 112 to a second client 120. Desktop archival may be accomplished streaming compressed desktop image, audio and/or peripheral device data to a storage apparatus attached to a second client 120.

Figure 15:
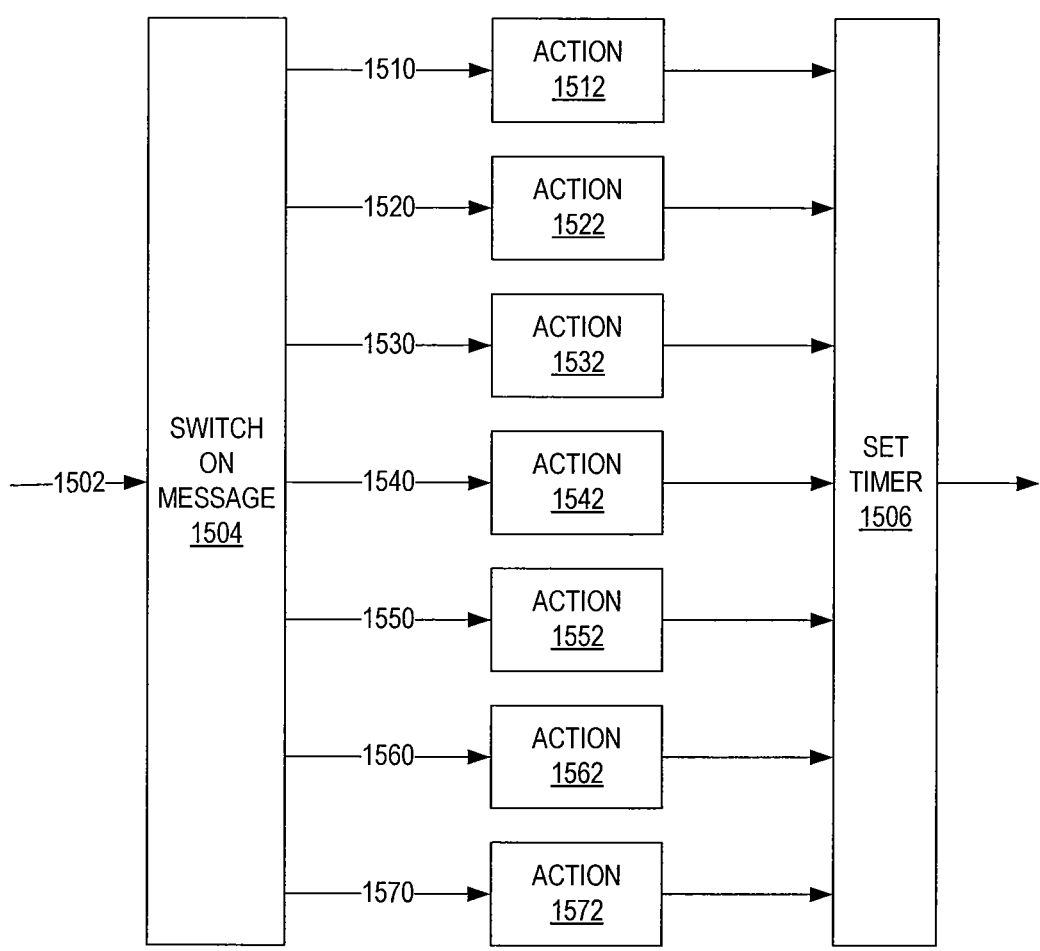
FIG. 15 illustrates an embodiment of a workflow template for an education environment.

FIG. 15 depicts an exemplary workflow template 1500 for a connection sequence used to automate an assignment in an education institution to demonstrate how a work item executed by workflow manager 450 might be deployed in an educational environment.

Briefly, workflow template 1500 is used by an educator to distribute a test or assignment to a number of students as work to complete. A desktop resource 108 (e.g., either an HDesk 112 configured with one or more applications or an HApp 116) that encapsulates the test or assignment to be performed is replicated as many times as necessary by the DRM 210, for example by cloning a pre-configured VM image. Connection sequencer 470 establishes connections between each student and a desktop resource 108, enabling the students to execute their assignments. Such connections may be automatically created or may require explicit student authentication in different embodiments. Once the students have completed their assignments, the connections are torn down and assignment results gathered for processing (e.g., grading) by queuing the desktop resources 108 for later access and evaluation by the instructor.

When workflow template 1500 is instantiated as a work item, data necessary for processing the connection sequence becomes associated, managed and stored in conjunction with the work item, for example though association with one or more session descriptors. Such data may comprise the state of participants (e.g., student participants described by session descriptors in list 490), information on how to contact, query and update the participants and the like.

Referring to FIG. 15, an incoming message 1502 is tested against a number of message options at step 1504. A particular message match then determines the state and configuration updates necessary to advance the scenario, the actions to be taken and the RPCs (if necessary) and/or session descriptors required to effect them.

In the event of a "Replicate n" message 1510, action 1512 comprises:

i) Instructing DRM 210 to instantiate 'n' VMs from a VM template where 'n' matches the number of students participating in the assignment, using for example RPC processing techniques.

In the event of a "VMs Setup Complete" message 1520, action 1522 comprises:

i) Instructing connection sequencer 470 and/or DRM 210 to configure a set of 'n' clients 120-1 through 120-$n$ and 'n' HDesks 112-1 through 112-$n$ for connection where each client is assigned to a student. Such instructions may be issued by placing a set of session descriptors on pending session descriptors 492, each descriptor providing the association between a client 120 and an HDesk 112. In some cases, DRM 210 may be engaged to tailor HDesks 112 by user identity, client identity or other requirements to provide individualization or randomness of test questions or applications.

In the event of a "Clients and VMs Configured for connection" message 1530, action 1532 comprises:

i) Instructing connection sequencer 470 to establish connections between clients 120 and HDesks 112. As described for template 1400, connection sequencer 470 may be tasked with moving session descriptors from pending session descriptors 492 to active session descriptors 494.

ii) In some embodiments, session initialization is time stamped for later recording of assignment execution time.

In the event of a "Student task complete" message 1540, action 1542 comprises:

i) Instructing connection sequencer 470 to tear down the session between the student's client 120 and student's HDesk 112 which may further comprise time stamping and retiring the active descriptor for the student session;

ii) Creating a new session descriptor associated with the HDesk 112 used by the student for a client 120; and iii) Placing the new session descriptor in pending session descriptors 492 assigned to the instructor.

In the event of an "All student tasks complete" message 1550, action 1552 comprises:

i) Providing notification to the instructor that student tasks are complete.

In the event of an "Instructor evaluation complete" message 1560, action 1562 comprises:

i) Instructing DRM 210 to reclaim the VMs and updating session statistics.

In some embodiments, instructor evaluation may be machine automated in which case in response to message 1540, the session is torn down and the out-of-session HDesk 112 is parsed by an evaluation machine (such as a computer configured to read and analyze data storage structures associated with an HDesk 112) to determine the results of the assignment.

In the event of a "Timeout" message 1570, action 1572 comprises determining the process(es) causing the timeout, rectifying error conditions and re-initiating or gracefully terminating the process(es).

Generally, step 1506 (which follows each of actions 1512, 1522, 1532, 1542, 1552, 1562, and 1572) comprises setting timer functions to enable progression monitoring and error management following the dispatch of RPCs or other remotely executed actions.

Figure 16:
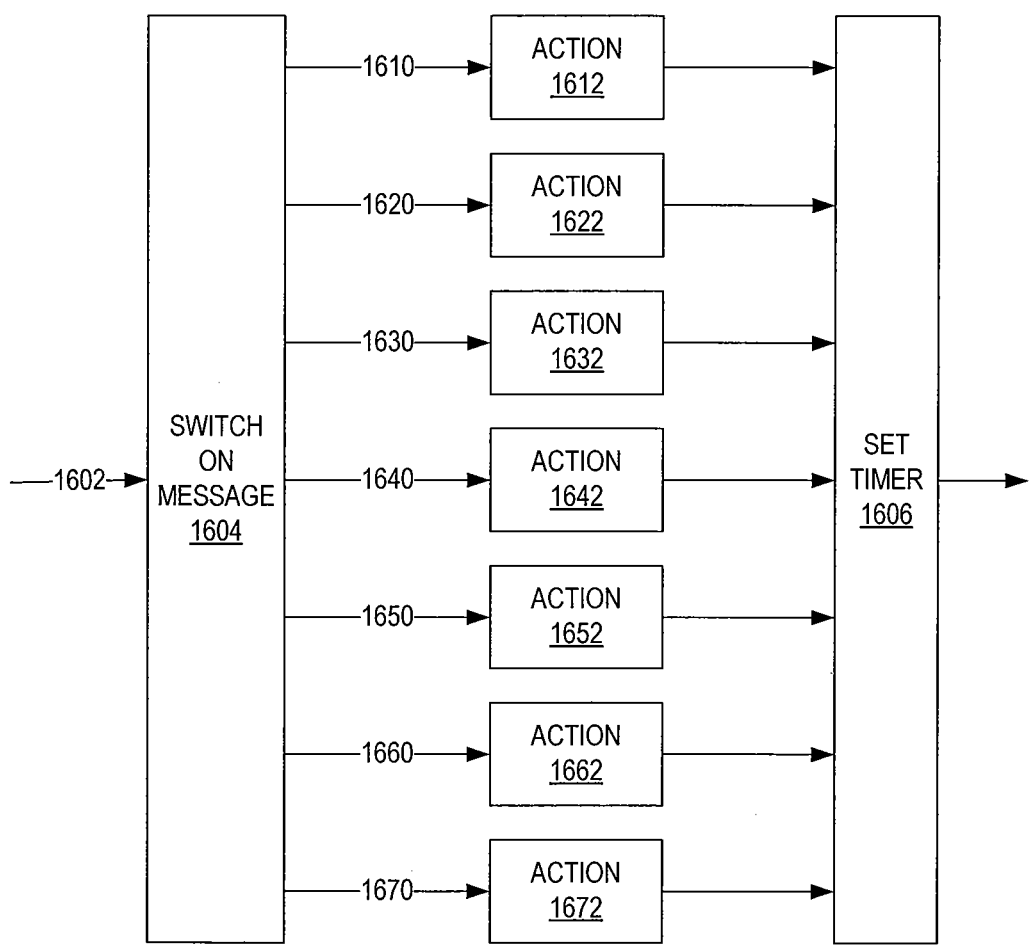
FIG. 16 illustrates an embodiment of a workflow template for a manufacturing production line.

FIG. 16 depicts an exemplary workflow template 1600 for a connection sequence used to automate a manufacturing production line, for example where a single desktop resource 108 participates in a sequence of sessions with a number of different clients 120 in a specified order and where each session in the sequence is used to accomplish some part of an overall work plan.

Briefly, workflow template 1600 is used by a production supervisor to set up a production job, assign it to a production line and monitor progress.

Referring to FIG. 16, an incoming message 1602 is tested against a number of message options at step 1604. A particular message match then determines the state and configuration updates necessary to advance the scenario, the actions to be taken and the RPCs (if necessary) and/or session descriptors required to effect them.

In the event of an "Initialize production application" message 1610, for example as dispatched by production control software on a computer coupled to network 190 to event queue 480, action 1612 comprises:
  i) Instructing DRM 210 to instantiate a VM and configure the production application such as instantiating a VM or HApp 116 associated with the identified production requirement from a VM template, using for example RPC processing techniques to dispatch the request to DRM 210.

In the event of an "Application setup complete" message 1620, action 1622 comprises:
  i) Configuring a session descriptor that assigns the HDesk 112 or HApp 116 to the production supervisor and placing the session descriptor with the pending session descriptors 492. The production supervisor then establishes a session with the desktop resource 108 and configures the workflow production order (e.g., comprising (n) production steps) and/or accesses the work item to tailor a specific client connection order.

In the event of an "Workflow configuration complete" message 1630, action 1632 comprises:
  i) Assigning the session descriptor to the first client 120 specified in the workflow production order; and
  ii) Moving the session descriptor to the pending session descriptors 492. The worker at client 120 then accesses the configured resource and the session descriptor is moved to the active session descriptors 494. On completion of a defined subset of production operations, the connection is torn down, the session descriptor is updated with next client specified in the workflow production order and returned to the pending session descriptors 492.

In the event of a "Workflow step (k) complete" message 1640 (where (k) identifies one of the (n) production steps), action 1642 comprises:
  i) Assigning the session descriptor to the k+1 client 120 specified in the workflow production order;
  ii) Moving the session descriptor to the pending session descriptors 492. The worker at client 120-(k+1) then accesses the configured resource and the session descriptor is moved to the active session descriptors 494. On completion of a defined subset of production operations, the connection is torn down, the session descriptor is updated with next client specified in the workflow production order and returned to the pending session descriptors 492.
  iii) Session statistics, timing information, security information and/or desktop resource state information may be captured during the workflow.

In the event of a "Quality Audit" message 1650, action 1652 comprises:
  i) In an embodiment, setting up a collaboration session between a quality engineer at a client 120 and the desktop resource 108 while a worker at client 120-k is in-session.
  ii) In another embodiment, either in-session or between sessions, utilizing software such as quality assurance software to analyze data structures associated with the desktop resource 108 against quality criteria.
  iii) In some embodiments, sequencing events (e.g., a message indicating completion of a session initialization or a session termination message) are time stamped for subsequent analysis.

In the event of a "Job complete" message 1660, action 1662 comprises:
  i) Instructing DRM 210 to reclaim the VM; and
  ii) Gathering final session statistics for the job.

In the event of a "Timeout" message 1670, action 1672 comprises determining the process(es) causing the timeout, rectifying error conditions and re-initiating or gracefully terminating the process(es).

Generally, step 1606 (which follows each of actions 1612, 1622, 1632, 1642, 1652, 1662, and 1672) comprises setting timer functions to enable progression monitoring and error management following the dispatch of RPCs or other remotely executed actions.

Numerous variations on the described workflow templates 460 are contemplated. For example, a call center workflow template may be combined with a production line workflow template such that an incoming call is directed to an interactive voice response (IVR) system or a generalist customer call agent (possibly in conjunction with a generalized desktop resource 108) and then redirected to a specialist customer call agent in conjunction with a desktop resource 108 configured with specialized application software related to the customer query. The generalist customer call agent may be tasked with instantiating tailored desktop resources 108 once the customer query is understood or the IVR system may be tasked with instructing DRM 210 with spawning a tailored VM from a library and configuring/assigning appropriate session descriptors.

While the foregoing is directed to embodiments of the present invention, other and further embodiments of the invention may be devised without departing from the basic scope thereof, and the scope thereof is determined by the claims that follow.

The invention claimed is:

1. A method for changing assignment of a remote desktop, comprising:
  responsive to a call forward message received by a unified communication (UC) signaling processor from a first telephony endpoint paired with a first client in a first connection to the remote desktop, receiving a session exchange request transmitted from the UC signaling processor over a network at a session exchange processor, wherein processing resources of the UC signaling processor and the session exchange processor are each independent of the remote desktop and wherein processing resources of the first telephony endpoint are independent of the first client;

selecting, by the session exchange processor, a second client identified by the session exchange request for connection to the remote desktop wherein the second client is paired with a second telephony endpoint identified by the call forward message, wherein processing resources of the second telephony endpoint are independent of the second client;

configuring, by the session exchange processor, the remote desktop and the second client by configuring session attributes according to a user of the second client;

tearing down the first connection between the first client and the remote desktop; and orchestrating, by the session exchange processor, a second connection between the second client and the remote desktop, wherein the second connection is a direct connection compliant with the session attributes.

2. The method of claim 1, wherein the second client is identified from a list presented to a user at the first client.

3. The method of claim 1, wherein the second client is identified by a workflow specification.

4. The method of claim 1, wherein the second client is identified from a pool of clients associated with the session exchange request.

5. The method of claim 1, wherein the second client is identified based on gathered statistics.

6. The method of claim 5, wherein the gathered statistics correlate a first profile associated with a calling party with a second profile associated with the second client.

7. The method of claim 1, wherein configuring the second client comprises communicating address information for the remote desktop to the second client.

8. The method of claim 7, wherein the address information comprises a connection manager address and a host name for the remote desktop.

9. The method of claim 7, wherein communicating address information is concurrent with the first connection of the first client to the remote desktop.

10. The method of claim 1, wherein configuring the second client comprises notifying the second client of the session exchange request.

11. The method of claim 10, wherein configuring the second client further comprises communicating a thumbnail image of the remote desktop to the second client.

12. The method of claim 11, wherein configuring the second client further comprises applying a desktop configuration to the remote desktop, the desktop configuration associated with the second client.

13. The method of claim 12, wherein the desktop configuration is described by at least one of a user profile for a user at the second client or a client topology of the second client.

14. The method of claim 1, wherein orchestrating the second connection comprises instructing one of the first client or the remote desktop to terminate the first connection before establishment of the second connection.

15. The method of claim 1, wherein orchestrating the second connection comprises establishing the second connection concurrently with the first connection.

16. A non-transitory computer readable medium for storing computer instructions that, when executed by a processor within a computer system, cause the processor to perform a method comprising:

responsive to a call forward message received by a unified communication (UC) signaling processor from a first telephony endpoint paired with a first client in a first connection to a remote desktop, receiving at a session exchange processor a session exchange request transmitted from the UC signaling processor over a network, wherein processing resources of the UC signaling processor and the session exchange processor are each independent of the remote desktop and wherein processing resources of the first telephony endpoint are independent of the first client;

selecting a second client identified by the session exchange request for connection to the remote desktop wherein the second client is paired with a second telephony endpoint identified by the call forward message, wherein processing resources of the second telephony endpoint are independent of the second client;

configuring the remote desktop and the second client by configuring session attributes according to a user of the second client;

tearing down the first connection between the first client and the remote desktop; and orchestrating a second connection between the second client and the remote desktop, wherein the second connection is a direct connection compliant with the session attributes.

17. An apparatus for sequencing remote desktop connections, comprising:

a session exchange processor configure for: (i) responsive to a call forward message received by a unified communication (UC) signaling processor from a first telephony endpoint paired with a first client in a first connection to a desktop resource, receiving at a session exchange processor a session exchange request transmitted from the UC signaling processor over a network, wherein processing resources of the UC signaling processor and the session exchange processor are each independent of the desktop resource and wherein processing resources of the first telephony endpoint are independent of the first client;

(ii) registering, in a session list of the session exchange processor, a pending connection based on the session exchange request, wherein the pending connection is specified between a second client identified by the session exchange request and the desktop resource, wherein the second client is paired with a second telephony endpoint identified by the call forward message, wherein processing resources of the second telephony endpoint are independent of the second client; and (iii) scheduling the pending connection based on the session exchange request, wherein scheduling the pending connection comprises configuring the desktop resource and the second client by configuring session attributes according to a user of the second client, tearing down the first connection between the first client and the desktop resource and initiating the pending connection between the second client and the desktop resource, wherein the pending connection is a direct connection compliant with the session attributes.

18. The method of claim 1 wherein applications provided by the remote desktop to the user of the second client are restricted according to the session attributes, and wherein the applications are restricted according to locations of the second client.

19. The method of claim 1 wherein configuring the session attributes comprises adjusting a z-order of application windows displayed by the second client, wherein the z-order defines a stacking order of application windows.

* * * * *